(12) United States Patent
Schlenoff

(10) Patent No.: US 10,087,082 B2
(45) Date of Patent: Oct. 2, 2018

(54) STABILIZED SILICA COLLOID

(75) Inventor: Joseph B. Schlenoff, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 1618 days.

(21) Appl. No.: 12/303,679

(22) PCT Filed: Jun. 5, 2007

(86) PCT No.: PCT/US2007/070443
§ 371 (c)(1),
(2), (4) Date: Apr. 7, 2009

(87) PCT Pub. No.: WO2007/146680
PCT Pub. Date: Dec. 21, 2007

(65) Prior Publication Data
US 2009/0202816 A1    Aug. 13, 2009

Related U.S. Application Data

(60) Provisional application No. 60/880,935, filed on Jan. 17, 2007, provisional application No. 60/811,373, filed on Jun. 6, 2006.

(51) Int. Cl.
*B32B 5/16* (2006.01)
*B32B 9/04* (2006.01)
(Continued)

(52) U.S. Cl.
CPC ............ *C01B 33/149* (2013.01); *B82Y 30/00* (2013.01); *C09C 1/3045* (2013.01);
(Continued)

(58) Field of Classification Search
None
See application file for complete search history.

(56) References Cited

U.S. PATENT DOCUMENTS 2,244,325 A    6/1941    Bird
2,597,871 A    5/1952    Iler
(Continued)

FOREIGN PATENT DOCUMENTS

| CA | 586261 A | 11/1959 |
|---|---|---|
| WO | 1986/05826 A1 | 10/1986 |
| WO | 20071146680 A1 | 12/2007 |

OTHER PUBLICATIONS

Lin, Y.S., Hung, Y., Su, J.K., Lee, R., Chang, C., Lin, M.L., Mou, C.Y. "Gadolinium(III)-Incorporated Nanosized Mesoporous Silica as Potential Magnetic Resonance Imaging Contrast Agents." J. Phys. Chem. B. 108 (2004): 15608-15611.*

(Continued)

*Primary Examiner* — Ronak C Patel
*Assistant Examiner* — Thomas A Mangohig
(74) *Attorney, Agent, or Firm* — Thompson Coburn LLP; Steven M. Ritchey

(57) ABSTRACT

A nanoparticle has at least one dimension less than 500 nm and comprises a silica surface and a plurality of zwitterionic functional groups covalently bound to the silica surface. Such nanoparticles and dispersions contain such nanoparticle are prepared and used for a variety of purposes.

39 Claims, 8 Drawing Sheets

(51) Int. Cl.
  *B01J 13/00* (2006.01)
  *C01B 33/149* (2006.01)
  *B82Y 30/00* (2011.01)
  *C09C 1/30* (2006.01)
  *C09K 3/14* (2006.01)

(52) U.S. Cl.
  CPC .......... *C09C 1/3081* (2013.01); *C09K 3/1409* (2013.01); *C01P 2002/52* (2013.01); *C01P 2004/62* (2013.01); *C01P 2004/64* (2013.01); *C01P 2006/12* (2013.01); *C01P 2006/60* (2013.01); *C01P 2006/80* (2013.01); *Y10T 428/259* (2015.01); *Y10T 428/2993* (2015.01)

(56) References Cited

U.S. PATENT DOCUMENTS

| | | | |
|---|---|---|---|
| 2,601,235 | A | 6/1952 | Alexander et al. |
| 2,614,994 | A | 10/1952 | Balthis |
| 2,622,307 | A | 12/1952 | Cogovan |
| 2,856,302 | A | 10/1958 | Reuter |
| 2,897,797 | A | 8/1959 | Alexander et al. |
| 2,995,453 | A | 8/1961 | Noble et al. |
| 3,314,911 | A | 4/1967 | Cull |
| 3,547,641 | A | 12/1970 | Blake |
| 3,682,668 | A | 8/1972 | Fujita |
| 3,922,393 | A | 11/1975 | Sears, Jr. |
| 4,987,286 | A | 1/1991 | Allen |
| 5,362,473 | A | 11/1994 | Panek |
| 5,958,288 | A | 9/1999 | Mueller et al. |
| 5,984,997 | A | 11/1999 | Bickmore et al. |
| 6,045,650 | A * | 4/2000 | Mitchnick et al. ........... 156/279 |
| 6,117,783 | A | 9/2000 | Small et al. |
| 6,126,532 | A | 10/2000 | Sevilla et al. |
| 6,455,024 | B1 | 9/2002 | Glajch et al. |
| 6,548,264 | B1 * | 4/2003 | Tan et al. ..................... 435/7.21 |
| 6,710,366 | B1 | 3/2004 | Lee et al. |
| 6,713,555 | B2 | 3/2004 | Moszner et al. |
| 6,749,485 | B1 | 6/2004 | James et al. |
| 6,803,353 | B2 | 10/2004 | Martyak et al. |
| 6,860,802 | B1 | 3/2005 | Vishwanathan et al. |
| 6,905,729 | B2 | 6/2005 | Wickramanayake |
| 6,939,211 | B2 | 9/2005 | Taylor et al. |
| 7,023,098 | B2 | 4/2006 | Umeno et al. |
| 7,037,351 | B2 | 5/2006 | Li et al. |
| 7,087,564 | B2 | 8/2006 | Misra et al. |
| 7,122,475 | B2 | 10/2006 | Hudson |
| 2003/0157025 | A1 | 8/2003 | Unger et al. |
| 2003/0199653 | A1 | 10/2003 | McCormick et al. |
| 2004/0101822 | A1 | 5/2004 | Wiesner et al. |
| 2004/0127045 | A1 | 7/2004 | Gorantla et al. |
| 2005/0004661 | A1 | 1/2005 | Lewis et al. |
| 2005/0026202 | A1 | 2/2005 | Edman et al. |
| 2005/0064192 | A1 * | 3/2005 | Jiang et al. ................... 428/404 |
| 2006/0083694 | A1 | 4/2006 | Kodas et al. |

OTHER PUBLICATIONS

Fujimoto, C.; Muranaka, Y. "Electrokinetic Chromatography Using Nanometer-Sized Silica Particles as the Dynamic Stationary Phase." J. High Resol. Chromatogr. (Jul. 1997): pp. 400-402.*
Litt et al., J. App. Polym. Sci., 1975, pp. 1221-1225, vol. 19.
Mueller et al., "Polishing Surfaces for Integrated Circuits", Chemtech, Feb. 1998, pp. 38-46.
Stober et al., J. Coll. Inter. Sci., 1968, 26, pp. 62-69.
Nilsson et al., "Nanoparticle-Based Pseudostationary Phases in Capillary Electrochromatography", Electrophoresis, 2006, pp. 76-83, vol. 27.
Weinberger, "Chapter 7—Electrokinetic Capillary Chromatography", Practical Capillary Electrophoresis, 1993, pp. 147-189, Academic Press, Inc.

* cited by examiner

STABILIZED SILICA COLLOID

CROSS-REFERENCES TO RELATED APPLICATIONS

The present application claims the benefit of PCT/US07/70443, filed Jun. 5, 2007, entitled "Stabilized Silica Colloid", which claims the benefit of U.S. Ser. No. 60/811,373, filed Jun. 6, 2006, entitled "Stabilized Nanoabrasive Suspensions" and U.S. Ser. No. 60/880,935, filed Jan. 17, 2007, entitled "Stabilized Nanoabrasive Suspensions", all of which are hereby incorporated herein by reference in their entireties.

FIELD OF THE INVENTION

The present invention relates to nanoparticle technology and, more particularly, to zwitterionically modified nanoparticles and associated compositions and methods.

BACKGROUND OF THE INVENTION

Abrasive materials are commonly used to polish surfaces. In the electronics and optics industries, polishing to a very high degree of smoothness is often required. For example, in chip manufacturing thin layers must be removed with extreme precision in a process that eventually yields complex circuitry on a microscopic scale. Increasingly complex, dense function and circuitry requires smaller features (dimensions) of the components on a chip, which, in turn, demands abrasive materials with smaller particle size. While current feature sizes are often less than 0.5 µm, feature sizes under 100 nm, such as 90 nm, 45 nm, 30 nm and less, are envisioned for applications in the near future. References herein to dimensional size, whether with respect to "features" or "diameter," refer to the smallest dimension of the particle in the sense of the smallest sieve opening that would permit passage of the particle therethrough.

With particular reference to a process known as chemical mechanical planarization (CMP), it is noted that polishing of substrates, which are commonly wafers, is performed with a suspension, dispersion, or slurry of particles. Both tribological and chemical mechanisms are important in producing the finished surface. Parameters such as the erosion rate and the planarity of the substrate are optimized for each application, as described in *Chemical-Mechanical Planarization*, (Eds. D. S. Boning, K. Devriendt, M. R. Oliver, D. J. Stein, I. Vos; MRS Symp. Proc. V 767; Materials Research Society, 2003); *Polishing Surfaces for Integrated Circuits*, by B. L. Mueller and J. S. Steckenrider, *Chemtech*, February, 1998, p 38; and *Chemical Mechanical Planarization of Microelectronic Materials*, J. M. Steigerwald, S. P. Murarka, R. J. Gutman, Wiley, 1997, all of which are hereby incorporated by reference to the extent relevant and consistent with the discussion herein.

Several examples of making sub-micrometer particles have been described in the literature. See for example, Bickmore et al. U.S. Pat. No. 5,984,997 and references cited therein. Moreover, nanoparticles are well known to the art (e.g. for a review see "*Nanoparticles Assemblies and Superstructures*, E. N. Kotov, Ed, 2006").

Martyak et al., U.S. Pat. No. 6,803,353, teach the addition of polishing slurries comprising sulfonated zwitterionic molecules dissolved in the aqueous medium to control the pH. Surfactants are often added to stabilize abrasive nanoparticle suspensions, but because they are surface active they adhere to the nanoparticle by physical forces, which are much weaker than chemical forces. They may also adhere to all surfaces to which they come into contact in the polishing suspension, leaving a residue after the CMP step is completed.

To make a polishing slurry, the particles are dispersed in a liquid, typically water. Many known methods directly produce nanometer colloidal suspensions. For example, Alexander, Iler and Wolter, U.S. Pat. No. 2,601,235, disclose colloidal silica suspensions. Silica colloids are stable suspensions of silica nanoparticles that have a diameter between about 1 nm and about 1 µm. Goodwin, J. W., Colloids and interfaces with surfactants and polymers: an introduction; John Wiley & Sons: Chichester, England, Hoboken, N.J., 2004. Silica colloids serve as inorganic binders for fibers (Fujita, A. U.S. Pat. No. 3,682,668), for stiffeners (Noble, R. D.; Bradstreet, S. W.; Rechter, H. L. U.S. Pat. No. 2,995,453), for refractory coatings (Reuter, R. U.S. Pat. No. 2,856,302), in floor wax to reduce slipping (Iler, R. K. U.S. Pat. No. 2,597,871), for anti-soiling surfaces to reduce pick up of dirt and to leave cleaner appearance after vacuuming (Cogovan, E. J. U.S. Pat. No. 2,622,307), for hydrophilizing surfaces (Blake, R. K. U.S. Pat. No. 3,547,641), and for polishing agents for silicon wafers (Sears, G. W. U.S. Pat. No. 3,922,393). Addition of silica colloids to organic polymers was found to improve durability, adhesion, hardness, and electrical properties of organic coatings. See Cull, N. L. U.S. Pat. No. 3,314,911.

Colloidal dispersions are often referred to as colloidal "solutions" even though they are not true solutions and such terminology is employed herein as well. Any of a variety of methods may be used to produce colloidal silica solutions or "silica sols." For instance, Alexander, Iler and Wolter, supra, describe the production of 3 weight percent (wt %) silica sols by partially neutralizing a dilute solution of alkali metal silicate with a mineral acid to a pH around 9. In this procedure, sodium silicate solution was first heated at 100° C. for 10 minutes to produce silica nuclei. Then silicate and sulfuric acid solutions were added simultaneously, while vigorously stirring the mixture at 95° C., producing silicic acid. Silicic acid deposited on the nuclei, forming particles with a diameter of 37 nm. Silica sols have been also made from hydrolyzable compounds such as silicon alkoxide, or silicon tetrachloride.

Stöber and Fink (J. Coll. Inter. Sci. 1968, 26, 62) reported that monodisperse suspensions of silica particles could be prepared by hydrolyzing a lower alkyl silicate in an alcohol medium in the presence of suitable amounts of water and ammonia. The particle diameter ranged from 0.05 to 2.0 µm. The chemistry is thought to involve the condensation of intermediate Si—OH groups to yield Si—O—Si networks. Other approaches to making stable silica sols include, electrodialysis, ion exchange, and dissolution of elemental silicon.

Stöber and Fink, supra, also reported that monodisperse suspensions of silica particles could be prepared by hydrolyzing a lower alkyl silicate in an alcohol medium in the presence of suitable amounts of water and ammonia. The particle diameter ranged from 0.05 to 2.0 µm. The chemistry is thought to involve the condensation of intermediate Si—OH groups to yield Si—O—Si networks. Other approaches to making stable silica sols include, electrodialysis (e.g. Sanchez, Canadian Patent 586,261), ion exchange (e.g. Bird, P. G. U.S. Pat. No. 2,244,325), and dissolution of elemental silicon (e.g. Balthis, J. H. U.S. Pat. No. 2,614,994)

Two of the problems commonly faced by those preparing and using suspensions or slurries of nanoparticles for polishing are the tendency toward agglomeration and the difficulty in removing particulates after CMP. With respect to the tendency of particles to agglomerate, it has been noted that silica sol will aggregate irreversibly by changing the ionic strength, concentration, pH, temperature, or addition of oppositely charged macromolecules and incompatible organic solvents. Aggregation broadly describes the different ways in which silica particles are precipitated out of the solution. It includes gelling, coagulation and flocculation.

Various approaches exist to stabilize nanoparticle suspensions against agglomeration or aggregation. Often, nanoparticles possess charged surfaces causing the particles to be electrostatically repelled from each other. In particular, stability is an important issue in formulations comprising silica sols, which derive their stability from electrostatic repulsion. As the solution pH increases above 2, the protonated silanol groups, Si—OH, start to dissociate, forming SiO-ions. At a certain point, sufficient negative ionic charges develop on the surface and mutual repulsion ensues.

It is well known that stable suspensions or colloids of well dispersed particles may be achieved. Unfortunately, however, these suspensions are destabilized in the presence of salts of sufficient ionic strength because the salt ions screen the electrostatic repulsions, allowing the particles to come into contact. Once in contact, different short-range forces take over and the particles remain adhered. The effective particle size is thus increased and the polishing performance of the suspension is negatively impacted.

Surfactants are often added to polishing suspensions to assist in the dispersal of the nanoparticles. However, surfactants adhere to all solid/aqueous interfaces and after the CMP step in chip manufacturing the surfactants must be removed before the next step. They become, in effect, unwanted residue.

With respect to the problem associated with removal of particulates following CMP, it has been found that particles adhere to a surface by van der Waals forces, electrostatic forces, capillary forces (arising from the surface tension of the liquid drawn into the capillary spaces around the contact points) and the like. As a general rule, the smaller the particle the more difficult it is to entirely remove particles from a surface. Thus, it is especially challenging to completely remove nanoparticles from a surface. Misra et al. U.S. Pat. No. 7,087,564, and references therein, describe methods to remove residues of polishing slurries in the "post-CMP cleaning" process.

Therefore, there is a need for abrasive nanoparticles that can be employed in polishing, which form stable suspensions under a wide range of conditions and which demonstrate minimal adhesion to surfaces.

Other problems encountered during the manufacture of silica colloid products include ensuring the absence of flocculating agents, controlling the pH, controlling temperature, and regulating ionic strength. These complications limit the scope of practical uses for silica colloid. Thus, there is a need to enhance the stability of colloidal silica dispersions.

Surface modification of silica colloids has been employed to alleviate instability. Alexander and Iler, exchanged aluminates into the $SiO_2$ surface, creating aluminosilicate sites having a fixed negative charge irrespective of the solution pH. The modified sols were more stable toward gelling at low pH and were less sensitive to salt than unmodified silica sols. One of the shortcomings, of aluminosilicate modified silica sols is their instability in solutions with ionic strength that exceeds 0.3 M NaCl, especially at pH 8.5, where they exist in a fully negatively charged state. It was also noted that aluminosilicate modified silica sols coagulated in the presence of proteins such as albumin bovine, possibly, due to ionic interactions with cationic groups on the protein surface.

In an alternative approach, Alexander and Bolt mixed acidified silica sols with oxides of aluminum, gallium, titanium or zirconium. The positively charged metal salts adsorbed to the silica surface, and reversed its charge. These modified silica colloids lack surface silanol groups, and siloxane bonds do not form when the sol is dried to a powder. As a result, these powders can be redispersed to a sol in water at pH 3-5. However the leaching of $Al^{3+}$ from the surface or the presence of polyvalent anions shows a destabilizing effect, especially at low pH.

To supplement ionic stabilization, the idea of steric hindrance was introduced. This was accomplished via adsorption of excess positively charged polymer on the silica surface. The length of the polymer chains is often smaller than the size of the silica colloid, and flocculation through interparticle bridging does not take place.

In addition to the conventional "homonucleus" silica sols described above, silica colloidal formulations with core-shell morphology have been also prepared. The surface properties of these colloids are governed by the silica shell, while the core comprises a different material that imparts the particles with desirable optical, magnetic, or catalytic properties. The core can be a modified silane reagent, or metal colloids such as silver and gold. Wiesner and Ow disclosed a process to prepare nanoparticle compositions with a core comprising fluorescent silane compounds and a silica shell on the core. The core was prepared by reacting 3-aminopropyltriethoxy silane with either tetramethylrhodamine isothiocyanate or ALEXA FLOUR® dyes. The product was hydrolyzed in a mixture of water, ammonia and alcohol, using a modified version of the Stöber method. Tetraethoxy silane was then added to the core containing solution and formed the silica shell upon hydrolysis.

SUMMARY OF THE INVENTION

In one sense, the invention is directed to a nanoparticle having at least one dimension less than 500 nm and comprising a silica surface and a plurality of zwitterionic functional groups covalently bound to the silica surface.

In another sense, the invention is also directed to dispersions of such nanoparticles.

In yet another sense, the invention is further directed to methods for preparation and use of such nanoparticles and dispersions thereof.

DETAILED DESCRIPTION OF THE INVENTION INCLUDING PREFERRED EMBODIMENTS

Figure 1:
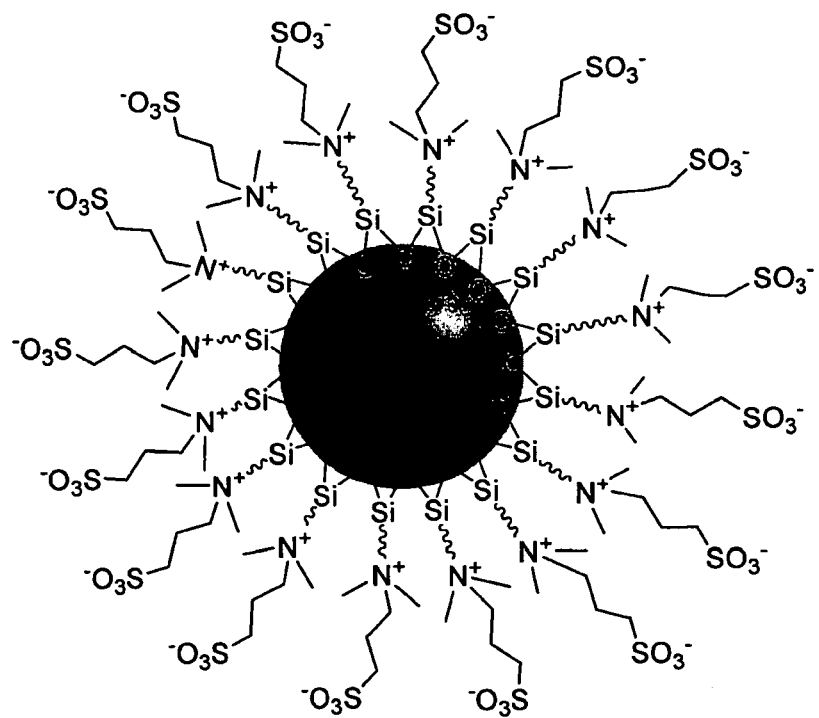
FIG. 1 is a schematic, unscaled representation of a nanoparticle with a silica surface following reaction with a betaine siloxane, such as SBS.

In accordance with the present invention, it has been discovered that modifying abrasive nanoparticles with a plurality of chemically bound zwitterionic functional groups imparts exceptional stability to the nanoparticle in solution, preventing aggregation and adhesion under a wide range of conditions.

As used herein, the term "nanoparticles" refers to particles having at least one dimension less than 500 nm. Preferred nanoparticles have one dimension less than about 100 nm. Particles smaller than about 100 nm (i.e., particles having at least one dimension less than about 100 nm) are known to remain suspended in solution, rather than settling out under the influence of gravity. Nanoparticles may assume a variety of geometries, such as spheres, hollow shells, rods, plates, ribbons, prisms, and stars. All geometries of nanoparticle are understood to be suitable for use in this invention. For example, a particle of length 2 μm and diameter 50 nm would be termed a "nanoparticle" even though one of its dimensions is larger than 500 nm. Similarly, a carbon rod of diameter 10 nm and length 5 μm would be termed a nanorod (i.e. a rodlike nanoparticle). Preferred nanoparticles suitable for this invention are abrasive, but it is also preferred that the nanoparticles are approximately spherical.

As is known in the art, any of numerous materials may be used to prepare the nanoparticles. Preferred materials for making nanoparticles, other than silica, include metals, metal oxides and semiconductor materials. Examples of metals include gold, silver, cobalt, copper, aluminum, nickel, platinum, lead, palladium, and iron. Examples of metal oxides are aluminum oxide, cerium(IV) oxide, dysprosium(III) oxide, erbium(III) oxide, gadolinium(III) oxide, holmium(III) oxide, samarium(III) oxide, titanium (IV) oxide, yttrium(III) oxide, zirconium(IV) oxide, cobalt oxide and iron oxide. In some embodiments of the invention, preferred nanoparticle materials are silica ($SiO_2$), alumina ($Al_2O_3$), titania ($TiO_2$), ceria ($CeO_2$), zirconia ($ZrO_2$), calcium carbonate, garnet, nanodiamond and silicates.

Selection of materials for making nanoparticles may depend on the desired property. For example, certain metals, alloys and oxides are known to have magnetic (ferromagnetic, paramagnetic, superparamagnetic) properties. Examples of magnetic materials comprise chromium (III), cobalt (II), copper (II), dysprosium (III), erbium (III), gadolinium (III), holmium (III), iron (III), iron (II), manganese (II), manganese (III), nickel (II), neodymium (III), praseodymium (III), samarium (III), terbium (III), and ytterbium (III). When sufficiently small, nanoparticles of ferromagnetic material tend to become superparamagnetic, i.e. their magnetic domains cannot be permanently aligned in any particular direction. Preferred ferromagnetic materials, such as alloys of iron and platinum, have high coercivity. Certain semiconductor materials, such as cadmium selenide, cadmium tellurium, cadmium sulfide, zinc sulfide, zinc selenide, lead sulfide, lead selenide, gallium arsenide, gallium phosphide, indium phosphide and indium arsenide are known to have useful electronic or optical properties (such as fluorescence). Preferred fluorescent nanoparticles comprise cadmium selenide, cadmium telluride or cadmium sulfide.

When preparing nanoparticles for this invention that are other than substantially silica, it is preferable that the nanoparticle comprise a surface layer of silica. This is because the preferred chemistry for producing zwitterionic groups on the surface relies on reaction of a silane molecule with a silica surface. A preferred morphology for nanoparticles used in the present invention is therefore the "core-shell" morphology, where a core comprises material other than silica and the shell comprises silica. Optionally the core comprises both silica and one or more other materials and the shell comprises silica. The diameter of the core can vary from about 1 nm to about 500 nm. The shell comprises the product of silica forming material(s) and the thickness of the shell may vary from a fraction of a monolayer to about 100 nm. The geometry of a core-shell nanoparticle is spheres, hollow shells, rods, ribbons, prisms, or stars. Preferably, the geometry is approximately spherical.

Suitable materials for the core of a core-shell nanoparticle include metals, metal alloys, metal oxides or semiconductors. Examples of metal cores include gold, silver, cobalt, copper, aluminum, nickel, platinum, lead, palladium, and iron. Examples of metal oxides are aluminum oxide, cerium (IV) oxide, dysprosium(III) oxide, erbium(III) oxide, gadolinium(III) oxide, holmium(III) oxide, samarium(III) oxide, titanium(IV) oxide, yttrium(III) oxide, zirconium(IV) oxide, cobalt oxide and iron oxide. The core can also incorporate other known magnetic (ferromagnetic, superparamagnetic, paramagnetic) materials. Examples of semiconductor cores are cadmium selenide, cadmium tellurium, cadmium sulfide, zinc sulfide, zinc selenide, lead sulfide, lead selenide, gallium arsenide, gallium phosphide, indium phosphide and indium arsenide. Preferred semiconductors for core-shell nanoparticles depend on their application. For example, preferred semiconductors for fluorescent nanoparticles have high quantum yields and are stable against photodegradation. The wavelength for emission of semiconductor nanoparticles is often selected by their size.

When siloxane bonds are used to chemically bind the zwitterion functionality to the surface of the nanoparticles for preparation of an abrasive suspension, it is desirable for the pH of the abrasive suspension to be no higher than about pH=8. This is because Si—O—Si bonds tend to hydrolyze at high pH values. While the presence of 3 siloxane bonds for each surface zwitterion group, shown in the formulae set forth herein, makes the chemical bond relatively more stable than if one or two siloxane bonds were formed, complete hydrolysis of the surface may result in the loss of the zwitterion functionality from the surface. However, for suspensions employed in the CMP of copper, a pH of about 6 is advantageous, as disclosed in U.S. Pat. No. 6,117,783. At a pH of 6 the siloxane bonds are stable. Therefore, copper is a preferred CMP substrate for zwitterions bound to the surface of an abrasive nanoparticle via siloxane bonds. Copper is employed as a high-performance interconnect in chip manufacturing.

Nanoparticles are often prepared with a core of one material and one or more shells of another material. A shell of CdS or ZnS around a core of CdSe chemically stabilizes the CdSe core. Accordingly, preferred nanoparticles comprise the structure core(shell)$_n$, where n is the number of shells and is preferably up to about 4. For example, U.S. Pat. No. 6,710,366, incorporated herein by reference to the extent relevant to and consistent with this specification, discloses a method of forming nanocomposites with a shell sandwiched between a core and a ligand layer of organic molecules. The core comprised inorganic crystals of Si, Ge, and C; Group II-VI semiconductor materials including but not limited to ZnS, ZnSe, ZnTe, ZnO, CdS, CdSe, CdTe, CdO, HgS, HgSe, HgTe, HgO, MgS, MgSe, MgTe, MgO, CaS, CaSe, CaTe, CaO, SrS, SrSe, SrTe, SrO, BaS, BaSe, BaTe, and BaO; Group III-V semiconductor materials including but not limited to AlN, AlP, AlAs, AlSb, GaN, GaP, GaAs, GaSb, InN, InP, InAs, and InSb; Group IV-VI semiconductor materials including but not limited to PbS, PbSe, PbTe, and PbO; mixtures thereof; and tertiary or alloyed compounds of any combination between or within these groups. The shell comprised a second organic or inorganic material, for example ZnS, ZnSe, ZnTe, ZnO, CdS, CdSe, CdTe, CdO, HgS, HgSe, HgTe, HgO, MgS, MgSe, MgTe, MgO, CaS, CaSe, CaTe, CaO, SrS, SrSe, SrTe, SrO, BaS, BaSe, BaTe, and BaO; Group III-V semiconductor materials including but not limited to AlN, AlP, AlAs, AlSb, GaN, GaP, GaAs, GaSb, InN, InP, InAs, and InSb; mixtures thereof; and tertiary or alloyed compounds of any combination between or within these groups. A shell may optionally comprise multiple materials, in which different materials are stacked on top of each other to form a multi-layered shell structure. The ligand layer comprised one or more surface ligands (e.g., organic molecules), for examples, alkyls, alkenyls, alkynyls, alkoxy, aromatics and aromatic heterocycles, conjugated aromatics, aromatic heterocycles, polyenes.

Regardless of whether the homogeneous (homonuclear) or the core-shell morphology is used for this invention, the silica may be further doped with materials having useful properties. For example, co-reaction of silanes bearing organic fluorescent groups, for example described by US Patent Publication No. 20040101822, yields fluorescent nanoparticles. The precursors to silica may be co-condensed with other materials. For example, co-condensation of methylene dithiepane-based silanes with aluminum, boron, titanium, zirconium, tin and/or vanadium produce formulations useful as dental materials (U.S. Pat. No. 6,713,555). Silica condensed with radioactive isotopes, such as technetium-99m (U.S. Pat. No. 5,362,473), provides nanoparticles useful for lung scintigraphy, and for radiotherapy. Silica particles doped with radionuclides and used for radiotherapy are described in U.S. Pat. No. 6,455,024. Preferred radionuclides include $^{111}$Ag, $^{199}$Au, $^{67}$Cu, $^{64}$Cu, $^{165}$Dy, $^{166}$Dy, $^{69}$Er, $^{166}$Ho, $^{111}$In, $^{177}$Lu, $^{140}$La, $^{32}$P, $^{103}$Pd, $^{149}$Pm, $^{193}$Pt, $^{195}$Pt, $^{186}$Re, $^{188}$Re, $^{105}$Rh, $^{90}$Sr, $^{153}$Sm, $^{175}$Yb, and $^{90}$Y. Condensation of silica forming reagents on the surface of gadolinium oxide nanoparticles produces agents useful in neutron capture treatment of tumor cells.

The term silica-capped nanoparticles, SCNs, will be used throughout this specification to describe nanoparticles that are either solid silica (homonucleus) or core-shell (silica shell).

The surface of the nanoparticle, whether homonucleus or with core-shell morphology, comprises a plurality of chemically bound zwitterionic functional groups, which can be pH-dependent, pH-independent, or a mixture of both. Examples of pH-independent zwitterionic functional groups include: N,N-dimethyl-N-acryloyloxyethyl-N-(3-sulfopropyl)-ammonium betaine, N,N-dimethyl-N-acrylamidopropyl N-(3-sulfopropyl)-ammonium betaine, 2-(methylthio) ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, 1-(3-sulfopropyl)-2-vinylpyridinium betaine, N-diallylamine ammonium betaine (MD-ABS), N,N-diallyl-N-methyl-N-(2-sulfoethyl) ammonium betaine, N,N-dimethyl-N-(3-methacrylamidopropyl)-N-(3-sulfopropyl) ammonium betaine, N,N-dimethyl-N-acryloyloxyethyl-N-(3-sulfopropyl) ammonium betaine, N,N-dimethyl-N acrylamidopropyl-N-(2-carboxymethyl)-ammonium betaine, N,N-dimethyl-N-methacryloyloxyethyl-N-(3-sulfopropyl)-ammonium betaine, and N,N-dimethyl-N-(3-methacrylamidopropyl)-N-(3-sulfopropyl) ammonium betaine. Examples of pH-dependent zwitterionic functional groups include: N,N-dimethyl-N acrylamidopropyl-N-(2-carboxymethyl)-ammonium betaine, N, N-dimethyl-N-acrylamidopropyl-N-(2-carboxymethyl)-ammonium betaine, [(2-acryloylethyl) dimethylammonio]methyl phosphonic acid, (2-acryloxyethyl) carboxymethyl methylsulfonium chloride and carboxybetaines. pH dependent zwitterions are preferred when the surface charge must be changed. When one of the charges (either the positive or the negative) on a zwitterion functional group is neutralized, e.g. by pH change, the overall surface charge shifts. For example, in the case of a carboxylate-comprising zwitterion group, protonation, e.g. by lowering the pH to less than the pKa of the zwitterion group, will remove negative charge, while in the case of an amine-comprising zwitterion group protonation will add positive charge to the surface. Changing the charge in this manner changes the interaction between the SCN and other components in the suspension, including other SCNs. In this respect, a preferred use of the SCNs of the present invention is to add carboxy zwitterion SCNs to basic proteins (positively charged). The basic proteins precipitate out due to interaction and agglomeration with the SCNs. The pH is raised, ionizing the carboxy zwitterions and disengaging the SCNs from the proteins. Preferred zwitterionic functional groups are sulfobetaine and phosphatidylcholine. Yet more preferred are sulfobetaines

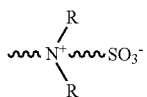

wherein R can be aliphatic, cyclo (pyrrolidine and piperidine) or aromatic (derivatives of phenylamine).

Zwitterions are chemically bound to the surface via a silane group of the formula

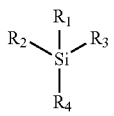

wherein $R_1$, $R_2$, $R_3$ and $R_4$ are independently selected from among alkyl, aryl, alkoxy, aryloxy, alkylether, arylether, akylester, arylester, amidoalkane and Surf-, where Surf represents a siloxane (—Si—O—), or some other bridging group, at the silica surface; and at least one of $R_1$, $R_2$, $R_3$ and $R_4$ comprises a zwitterion group; and at least one of $R_1$, $R_2$, $R_3$ and $R_4$ comprises Surf-. Preferred hydrocarbon chain lengths are 1 to about 18 carbons long.

Preferably the zwitterion group corresponds to

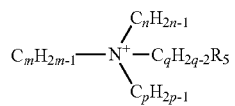

wherein m, n, p, q are each from 1 to about 18 and $R_5 = SO_3^-$, $PO_4^-$, or $COO^-$. For zwitterion groups, it is preferred to have the Positive and negative charges close to each other so that the possibility of these charges interacting with others in solution is minimized. For example, when using a sulfobetaine (i.e. when $R_5 = -SO_3^-$) it is preferred to keep the distance between the ammonium ($N^+$) group and the sulfonate (—$SO_3^-$) group less than about six carbon-carbon bond lengths; i.e., q should be <6, preferably, q=3.

Thus, the following is a partial list of zwitterionic functional groups suitable for this invention.

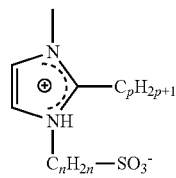

Sulfoalkyl imidazolium salts

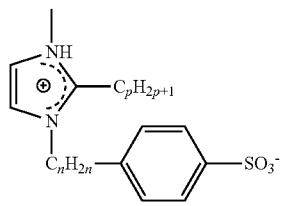

Sulfoaryl imidazolium salts

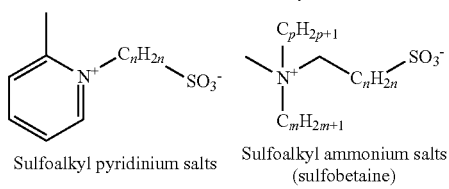

Sulfoalkyl pyridinium salts

Sulfoalkyl ammonium salts
(sulfobetaine)

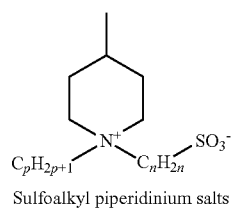

Sulfoalkyl piperidinium salts

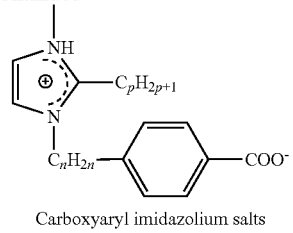

Carboxyaryl imidazolium salts

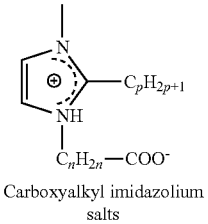

Carboxyalkyl imidazolium salts

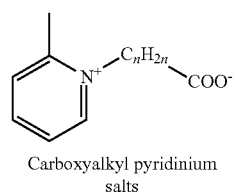

Carboxyalkyl pyridinium salts

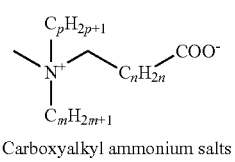

Carboxyalkyl ammonium salts

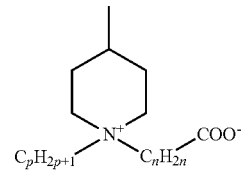

Carboxyalkyl piperidinium salts

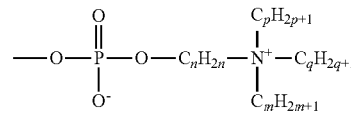

Phosphatidylcholine analogues

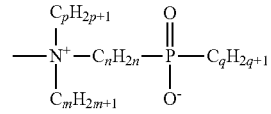

Ammonium phosphonate salts

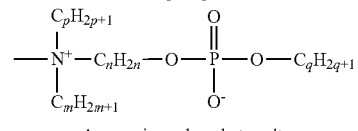

Ammonium phosphate salts

As noted above, pH dependent zwitterions are preferred when the surface charge must be changed. When one of the charges (either the positive or the negative) on a zwitterion functional group is neutralized, e.g. by pH change, the overall surface charge shifts. For example, in the case of a carboxylate-comprising zwitterion group, protonation, e.g. by lowering the pH to less than the $pK_a$ of the zwitterion group, will remove negative charge, while in the case of an amine-comprising zwitterion group protonation will add positive charge to the surface.

It is well known by those skilled in the art that silanes with multiple groups reactive to silica may not react completely with silanols on the surface. Incomplete reaction will lead to a surface that is not of uniform composition. The surface zwitterion functionality is obtained by the action of a zwitterion silane, as shown below, on silica-capped nanoparticle.

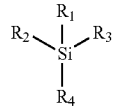

wherein $R_1$, $R_2$, $R_3$, and $R_4$ are independently, alkyl, aryl, alkoxy, aryloxy, alkylether, arylether, akylester, arylester, amidoalkane, or chloro; and at least one of $R_1$, $R_2$, $R_3$, and $R_4$ comprises a zwitterion group; and at least one of $R_1$, $R_2$, $R_3$, and $R_4$ comprises alkoxy or chloro. Preferably, the zwitterion group comprises

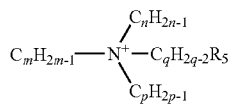

wherein m, n, p, q are each 1 to about 18 and $R_5=SO_3^-$, $PO_4^-$, or $COO^-$, and at least one of $R_1$, $R_2$, $R_3$, and $R_4$ is $-O-C_rH_{2r-1}$ wherein r is from 1 to about 18.

Preferably, the reaction between silica-capped nanoparticle surface and a silane is performed by a zwitterion alkoxysilane of the formula

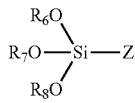

wherein $R_6$, $R_7$ and $R_8$ are alkyl groups of the formula $-O-C_rH_{2r-1}$ wherein r is from 1 to about 18 and Z is a zwitterion group, preferably of the formula

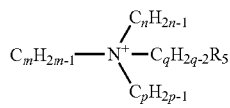

wherein m, n, p, q are 1 to about 18 and $R_5=SO_3^-$, $PO_4^-$, or $COO^-$ and at least one of $R_1$, $R_2$, $R_3$ and $R_4$ is $-O-C_rH_{2r-1}$ wherein r is from 1 to about 18. More preferably, Z is ammonium betaine. Yet more preferably, the zwitterion alkoxysilane is 3-(dimethyl(3-(trimethoxysilyl)propyl)ammonio)propane-1-sulfonate, SBS, $(C_8H_{18}NO_3S)$ $Si(OCH_3)_3$; i.e.,

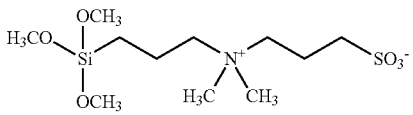

Chlorosilanes, wherein the alkoxy group in the formula above is replaced by a chlorine atom, are generally known to be more reactive to surface Si—OH groups, but are also much more reactive towards water. Thus, chlorosilanes are preferred for reaction in aprotic organic solvents but not water.

Methods for preparing silica surfaces to which zwitterions are attached will be described with particular attention to silica nanoparticle surfaces and zwitterion alkoxysilane. However, this should be understood as merely illustrative and it will be readily understood by those of ordinary skill in the art that similar techniques may be adapted and applied to the other surfaces, types of nanoparticles and zwitterion compositions discussed above. According to one method for bonding zwitterion groups to silica surfaces in the case in which the surfaces are nanoparticle surfaces, a dispersion or solution of such nanoparticles is treated with a zwitterion alkoxysilane. The preferred concentration of nanoparticles in the solution is between about 0.01 wt % and about 30 wt % and the preferred concentration of zwitterion alkoxysilane is that which provides enough zwitterion alkoxysilane to be sufficient to react with SiOH present on the surface. The amount of zwitterionic alkoxane may be determined by the diameter and specific surface area of the nanoparticle. The medium for reaction comprises between 0 and 100% water, the balance (if any) being made up by an organic solvent such as ethanol, methanol, DMF, DMSO, 1,4 dioxane, THF, acetonitrile, acetone, n-butanol, isopropanol, and n-propanol. If an organic solvent system is to be used, sufficient water must be present to promote the hydrolysis/condensation reactions that attach the zwitterion silane to the surface. The amount of water is typically between 1 ppm and 1%.

It is well known by those skilled in the art that surface reactions are incomplete. Incomplete reaction will lead to a surface that is not of uniform composition. While it is not required for all the surface sites to have reacted, preferred nanoparticles have at least 25% of their potential points of surface reaction actually converted by a reaction. The preferred chemistry employs the reaction of silanes or siloxanes with silica surfaces. While many schemes for the covalent or chemical binding of molecules to various types of surface are known to the art, silane coupling chemistry is by far the most widely practiced art. Accordingly, the surface zwitterion functionality is preferably obtained by the action of a zwitterion silane, as shown below, on silica nanoparticle.

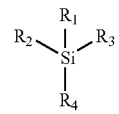

wherein $R_1$, $R_2$, $R_3$, and $R_4$ are independently, alkyl, aryl, alkoxy, aryloxy, alkylether, arylether, alkylester, arylester, amidoalkane, or chloro; and at least one of $R_1$, $R_2$, $R_3$, and $R_4$ comprises a zwitterion group; and at least one of $R_1$, $R_2$, $R_3$, and $R_4$ comprises alkoxy or chloro.

It is known by those skilled in the art, and is further demonstrated in the Examples below, that reactions on the surface of silica rarely remove all of the silanol (Si—OH) groups. Further, the surface may be treated with a mixture of silanes to yield a mixed surface composition. Preferably, the silanes added in addition to the zwitterion silane comprise mercapto, ureido, epoxy, acrylyl, methacrylyl, carboxyl or amino. The purpose of these additional functional groups at the surface of the nanoparticles is to enable further reaction with other synthetic or biological molecules.

Each of the treated nanoparticles, therefore, comprises at least one silica surface which further comprises a plurality of chemically bound zwitterion groups and such surfaces are hereinafter termed SiZwi. A representation of a nanoparticle with a silica surface following reaction with a betaine siloxane, such as SBS, is shown schematically (and not to scale) in FIG. 1.

A suspension of the coated nanoparticles may then be prepared with a liquid such as water. The suspension may be in the form of a colloidal suspension or "solution" or such colloidal solution may be prepared for use as an abrasive or for any of the other of the variety of applications noted above.

An abrasive suspension comprising nanoparticles which further comprise a plurality of chemically bound surface zwitterion groups is hereinafter termed npZwi. Abrasive nanoparticles are usually composed of single component inorganic, typically oxide, materials. However, Taylor et al. (U.S. Pat. No. 6,939,211) have recently disclosed an abrasive element for use in a liquid planarizing slurry comprising: a core having a first hardness, the core having an exterior surface and an interior, and the core being sized to be suspended in the liquid planarizing slurry; and a plurality of abrasive particles having a second hardness different than the first hardness of the core, wherein the abrasive particles are partially embedded into the interior of the core. For example, the core may comprise a softer organic polymer particle to which smaller inorganic particles are adhered. Such a combination of soft and hard materials is claimed to cause fewer surface defects during CMP than abrasive suspensions comprising inorganic particles only. Accordingly, in one aspect of this invention, the abrasive suspension comprises particles comprising a core of polymeric material and a surface decorated with a plurality of abrasive nanoparticles comprising chemically bound zwitterion functionality. Other core-shell structures are optional, including abrasive nanoparticles comprising a core of one material with a first hardness and a shell of a second material having a second hardness. Preferably, the shell comprises silica, which provides for a wide variety of surface chemistry for covalent attachment of zwitterion functionality.

As noted above, in the abrasive embodiment, it is preferred that the nanoparticles be generally spherical. Moreover, each method of synthesizing abrasive nanoparticles typically yields a distribution of particle size. In the present invention as it pertains to abrasives, it is preferred to use a suspension of nanoparticles with a narrow size distribution because nanoparticles of wide distribution typically contain particles that are considerably larger than the mean diameter and that cause defects (scratches) on the surface of the substrate. Preferably, the relative standard deviation, RSD, of the diameters of abrasive nanoparticles is less than 20%, more preferably the RSD is less than 10%. Optionally, abrasive nanoparticles of different sizes are mixed. For example, an adhesive suspension can contain a bimodal distribution of particle sizes. Each mode of size is preferably of narrow distribution. For bimodal distributions of nanoparticles, the mean diameter of the smaller particle is preferably 10-90% of the mean diameter of the larger particle. Hudson (U.S. Pat. No. 7,122,475) teaches various uses of CMP compositions with bimodal particle distributions. Optionally, the suspension of particles is filtered or centrifuged to remove agglomerates.

Abrasive suspensions may comprise more than one type of nanoparticle. For example, the suspension optionally contains a mixture of nanoparticles comprising a surface modified with covalently bound zwitterion, and nanoparticles comprising a surface without zwitterions. Because the zwitterions are covalently bound to one of the nanoparticle populations, they do not detach and migrate to the other nanoparticle population, as would be the case for physically adsorbed surfactants. Such a mixture of abrasive nanoparticles permits the zwitterion-bearing nanoparticles to assist the detachment and dispersion of the non-zwitterion nanoparticles. For example, a mixture of npZwi comprising zwitterions covalently bound to silica is optionally mixed with ceria or diamond nanoparticles without zwitterions on their surface. The ceria, having a greater hardness, is a more aggressive polishing agent, whereas the silica, bearing zwitterions, is better dispersed and stabilized against aggregation. The zwitterion-bearing silica helps to dislodge the ceria particles off the surface during and after CMP. In such a mixture, the zwitterion-bearing nanoparticle preferably have a smaller diameter than the nanoparticle without zwitterion. Preferably, the ratio of diameters of the larger to smaller particle is between 1.1 and 10. The relative concentration (number per unit volume) of smaller to larger nanoparticles is between 0.01 and 100, preferably between 0.1 and 10.

The abrasive nanoparticles are preferably dispersed in a liquid vehicle, preferably water. Among the advantages of water may be noted its ready availability in a very pure form, its low cost, its non-toxicity and consequent lack of regulatory concerns and its compatibility with zwitterionic functionality. Preferred loadings for abrasive nanoparticles range from 0.1 to 50 wt %, more preferably 1-10 wt %. Optionally, the vehicle for dispersion of nanoparticles further comprises organic solvent, which may aid in dispersal of the numerous components typically added to CMP dispersions, especially when additives having poor solubility in water are employed. For reasons of minimizing the volatile organic carbon (VOC) and cost, the preferred amount of organic solvent added is less than 10%.

In addition to abrasive particles and vehicle, a wide variety of further components are optionally added to CMP suspensions and are suitable as additives in the abrasive embodiment of the present invention. For example, Li et al. (U.S. Pat. No. 7,037,351) and references therein teach various additives for CMP suspensions and that may be employed in the abrasive embodiment of the present invention. These additives include oxidizing agents, surfactants, buffers, passivating agents, metal chelating agents, viscosity modifiers, wetting agents, lubricants, stopping compounds and the like. Suitable oxidizing agents include hydrogen peroxide, persulfates, ferric salts, ferric ammonium salts, ferricyanide, nitric acid, ammonium molybdate, iodates, inorganic peroxides, organic peroxides, peracetic acid, iodine, chlorates, chlorites, perchlorates, bromates, bromites, perbromate, nitrates, iodates, permanganates, chromates and hypochlorites and combinations and salts thereof.

A preferred concentration for hydrogen peroxide, when used as oxidizer, is from about 0.1 to 40 wt % and more preferably from 1 to 5 wt %. Catalysts may be used to accelerate the erosion rate of the substrate. For example, U.S. Pat. No. 5,958,288 to Mueller et al. describes the use of soluble metal co-catalysts for activating $H_2O_2$ for the planarization of tungsten. Passivating agents or corrosion inhibitors for copper substrates include azole derivatives. For metallic substrates, a preferred passivating agent, believed not previously known to the art, is a small organic molecule further comprising a thiol (S—H) or disulfide (S—S) group (i.e., Z—SH or Z—S—S—Z, wherein preferred zwitterionic groups, Z, are listed above). The thiol group exhibits strong chemical interactions with many metals, including copper and, therefore, the required concentration of molecules comprising the thiol group in the dispersion is low. The preferred concentration of zwitterionic molecules comprising the thiol or disulfide group is 0.00001-1 wt %, with 0.0001-0.01 wt % more preferred. An additional advantage of a surface-bound thiol comprising a zwitterion is that the zwitterion on the surface resists attachment of abrasive particles to the surface. Further, particles of metal detached from the surface are stabilized by chemisorbed Z—SH and removed more efficiently from the surface. Optionally, the zwitterion siloxane that was used to coat the nanoparticles may be added to the abrasive suspension prior to, or during, the planarization step.

The suspension of abrasive nanoparticles is preferably optimized for use in chemical mechanical planarization of microelectronic circuits. The feature sizes of said circuits are preferably 200 nm or less, more preferably less than 90 nm. The preferred interconnect material is copper. In a preferred method of use of this invention, the surface of a wafer suited for fabrication of a semiconductor device is modified as follows:
(i) a pattern is etched into a wafer of a first material
(ii) a second material is deposited on the surface of the first material
(iii) a suspension abrasive of nanoparticles of the present invention is deposited on the wafer
(iv) a polishing pad is placed in contact with the suspension
(v) light pressure is applied by the pad while it is moved relative to the wafer until the wafer is planar and an area of the first material is exposed.
(vi) the suspension of abrasive nanoparticles is removed from the surface of the wafer.

The first material is typically a dielectric with an additional adhesion or barrier layer optionally applied thereon. The second material is typically a metal selected from the group copper, aluminum, titanium, tungsten or alloys thereof. The suspension of nanoparticles is dispensed directly as a slurry or is supplied via holes, pores, or channels in the pad. The pad material may be soft or firm, made of cloth, polymer or ceramic, depending on the application. Rollers or bands may be used in place of a pad. Examples of the desirable properties of pads and methods for their use are described in Vishwanathan et al. U.S. Pat. No. 6,860,802, James et al. U.S. Pat. No. 6,749,485, and Sevilla et al. U.S. Pat. No. 6,126,532. The pressure between the pad and the substrate is typically from 0.1 to 25 psi, preferably in the range 1 to 6 psi. The movement of the pad relative to the substrate may be circular, orbital, random, linear, or elliptical. Preferred rotational speeds are from 10 to 1000 rpm. Optionally, the surface of the pad contacting the substrate comprises the abrasive nanoparticles of the present invention, imbedded in said surface to a depth between 10 and 90% or their diameter. The surfaces of said imbedded nanoparticles comprise chemically bound zwitterionic functional groups.

To expedite the planarization, as high a removal rate of substrate as possible without compromising the substrate topography is desired. The preferred removal rate in CMP is greater than 100 nm per minute.

The preferred methods of removing abrasive nanoparticles from the surface of the substrate is by rinsing, preferably with aqueous solutions, preferably pure water. Optionally, the rinse may be pH buffered by buffering agents known to the art. If pH-sensitive zwitterions have been disposed on the surface of the abrasive nanoparticles, pH control of the rinse solution is preferred. Accordingly, CMP of the substrate may proceed at a first pH and rinsing of the substrate may proceed at a second pH. During the course of the CMP process, the pH may be raised or lowered.

Removal of residual nanoparticles is performed with a jet of liquid or gas. Alternatively, removal of residual particles may be performed by irradiation with a laser of sufficient energy to cause explosive evaporation of residual water, as described by S. D. Allen in U.S. Pat. No. 4,987,286.

Silica sols modified as disclosed in the present invention are also suitable for several other applications, for example, as additives in papermaking formulations. PCT application WO86/05826 describes the use of silica sols in combination with polyacrylamide to enhance the retention and drainage of the pulp used in papermaking. It is also known to the skilled in the art that silica nanoparticles, typically in the size range of 1-7 nm, act as links that bridge the loops and tails of cationic starch and polyacrylamide, which are adsorbed on different fibers with the loops extending into solution. This results in very strong association of the pulp to provide excellent drainage and retention. It has been an aim that silica sols used in papermaking be discrete, non-aggregated, and have a narrow size distribution. Conventionally, however, such requirements are difficult to maintain if the pH is decreased below 7 or if salt is present in concentrations greater than about 0.1M. Nevertheless, silica sols of the present invention have been found, advantageously, to exhibit excellent stability not only in acidic and basic media, but also, in high ionic strength saline environments.

Silica colloids, as paper additives of the kind described in this invention, also provide better media sheets for ink jet printing (U.S. Pat. No. 6,905,729). Best printing results are accomplished when the colorants stay on the surface of the paper to retain as much of the color density as possible while allowing the solvent to be absorbed. If aqueous based ink formulations are used, zwitterion groups on the surface of silica colloids boost the ability of the paper to absorb moisture. As described in Example 9, below, other chemical moieties, in addition to zwitterions, can coexist on the surface of the silica colloids. Thus, an amine terminated silane reagent (preferably extending beyond the zwitterion groups) can be utilized, for example, to act as a dye fixing agent that keeps the ink exactly where it hits, while the aqueous vehicle pass by and get absorbed by the zwitterion coated silica.

US Patent Publication No. 2004/0101822 discloses a process to prepare fluorescence silica based nanoparticles. These formulations can further include a combination of antibodies and therapeutic or diagnostic agents, thus functioning as a pharmaceutical carrier or drug delivery vehicles. For this nanocarrier to interact with its target successfully, it has to survive the stringent in vivo environment. Specifically, it must avoid non-specific interactions with other proteins and cells that might exist in the blood stream. The silica sols of the present invention advantageously expose, on their surface, a sulfobetaine functional group that imparts to the silica colloids an unprecedented stability against flocculation by oppositely charged proteins. As disclosed in Example 7, below, the silica sols of the present invention are, conveniently, stable at isotonic conditions.

Silica colloids are also utilized as inorganic fillers in epoxy resin formulations used to encapsulate semiconductor chips. U.S. Pat. No. 7,023,098 describes the use of inorganic fillers (94 wt % or less of the total amount of the epoxy resin composition) to enhance the strength and decrease water absorption by a cured product of the epoxy resin. Such high concentrations of silica colloids represent a precursor for destabilization and inter-particle crosslinking. Functionalizing the surface of the silica additives, using the methods disclosed in this invention, will stabilize them and facilitate their utility in concentrated formulations.

The silica sols of the current invention may also have utility in detergents (to inhibit corrosion, improve wetting, disperse oily soils, deflocculate inorganics, buffer wash water), grease-proof films and coatings, and in emulsion breaking (municipal sludge dewatering, clarification of aqueous mineral slurries, refinery emulsion breaking and the like). Other applications will be apparent to those of ordinary skill in the art upon reading this specification.

EXAMPLES

Reagents

Colloidal silica (LUDOX™, tetraethyl orthosilicate (TEOS, reagent grade), propane sultone and lysozyme were from Sigma-Aldrich. N, N dimethyl amino propyl trimethoxy silane, dAPT (density 0.984 g mL$^{-1}$), and sodium chloride were from Gelest and Fisher respectively. Dimethylsulfoxide and acetone (99.9% pure) and absolute ethanol were used as received from Sigma-Aldrich. Concentrated ammonium hydroxide and hydrochloric acid, HCl 1.0 M, were from Fisher. Deionized water (18 MΩ Milli-Q) was used to prepare all aqueous solutions.

Example 1. One-Pot Synthesis of Silica Colloids with Zwitterion Silane Shell All reagents were used as received. The molarity of ammonia was determined by titration with methyl orange indicator before each synthesis. Ammonia and deionized water were dissolved in absolute ethanol to a final concentration of 0.5M and 1.8M, respectively. While stirring the mixture, 0.17 M TEOS was added in one portion. The reaction was carried out at room temperature in an Erlenmeyer flask fitted with a rubber stopper. Within 2 hours of the reaction initiation the color of the reacting solution became bluish and did not change after 24 hr. This was an indication that the silica particles had formed. The hydrodynamic radius ($R_h$) of the particles measured in absolute ethanol using quasielastic light scattering (Wyatt Technologies), was 22±2 nm. The surface area and porosity of the particles were 287 m$^2$ g$^{-1}$ and 5 nm respectively (measured with an ASAP 2020).

The reaction solution was then diluted by deionized water (33% Vol) and SBS (3.81×10$^{-3}$ mol per 1 gram of SiO$_2$) was added in sufficient amount to react with SiOH present on the surface (the amount was determined by the specific surface area of the nanoparticles). After 24 hr, the $R_h$ of the particles was 23±2 nm. The sample was purified by extensive dialysis for three days against distilled water using 14,000 molecular-weight-cutoff dialysis tubing. In order to avoid precipitation of the colloids during dialysis, ammonium hydroxide was added to adjust the pH of the bathing solution to 9.0.

Example 2. Zwitterion Silane Synthesis

Monomer Synthesis

Zwitterion alkoxysilanes of any sort are not commercially available. Litt and Matsuda (J. App. Polym. Sci. 1975, 19, 1221) reported the modification of aminoalkylsilanes by ring opening addition of propane sultone to produce zwitterionic silanes. The ampholytic character of the later was a function of the solution pH, since in acidic media the amine group is protonated. In this invention we followed a similar procedure; however, the product of propane sultone and dimethylaminoalkylsiloxane gave a zwitterionic silane that maintains its ampholytic character over a broader pH range. Zwitterion (sulfobetaine) silane reagent, 3-(dimethyl(3-(trimethoxysilyl)propyl)ammonio)propane-1-sulfonate, SBS, was synthesized by reacting N,N-dimethyl-3-(trimethoxysilyl)propane-1-amine, APT, and propane sultone in dry acetone at room temperature with continuous stirring for 12 hours (Equation 1). The fine white precipitate was filtered, washed with acetone and dried giving a yield of 90%. The reaction and product purification was carried out inside a dry box to avoid exposure to any source of humidity which can cause hydrolysis and subsequent condensation/polymerization of SBS.

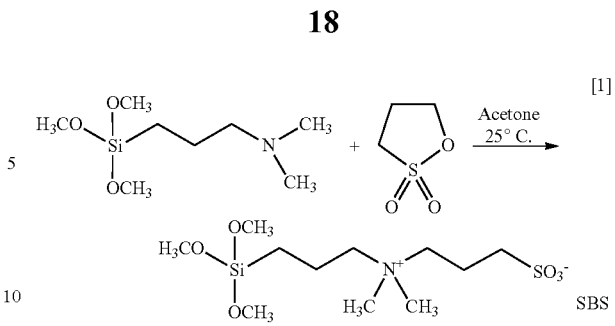

The NMR spectrum was run at room temperature, with tetramethylsilane as an external standard. The peak assignments and chemical shifts were as follows:

$^1$H NMR (DMSO-6D, 300 MHz): δ 0.4-0.6 (B, t, 2H), 1.6-1.8 (C, m, 2H), 1.9-2.0 (G, m, 2H), 2.4-2.5 (D, t, 2H), 3.0 (E, S, 6H), 3.1-3.3 (F, m, 2H), 3.3-3.4 (H, m, 2H), 3.5 (A, S, 9H).

Synthesis of SiZwi

Figure 2:
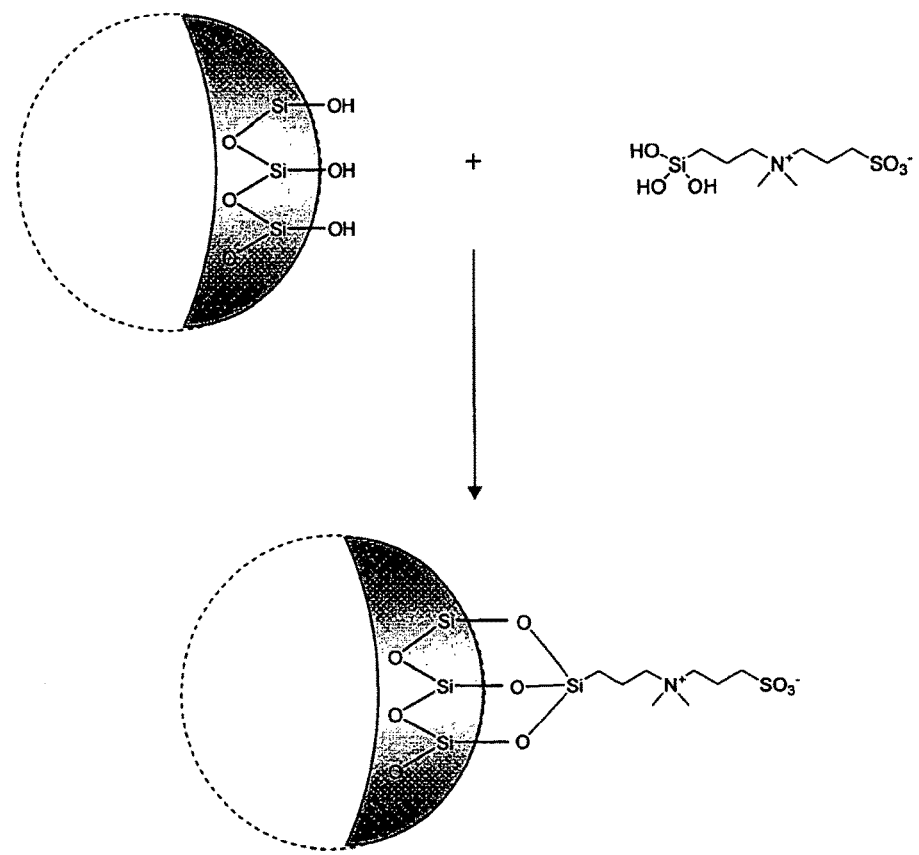
FIG. 2 is formulaic and schematic representation of the reaction of SBS with silica colloids to yield zwitterion "decorated" silica nanoparticles.

SBS was then added to an aqueous solution of silica colloids, ca. 22 nm in diameter (as 9.11×10$^{-4}$, 7.288×10$^{-4}$, 5.466×10$^{-4}$, or 3.64×10$^{-4}$ mols per 1 g SiO$_2$), and allowed to react for 12 hours at room temperature with continuous stirring, yielding zwitterion "decorated" silica nanoparticles or SiZwi as illustrated in FIG. 2.

This illustration of a sulfobetaine siloxane reaction with the surface of the silica colloids shows, first, the siloxane ligand hydrolyzes in water and the newly formed hydroxyl groups interact via hydrogen bonding with the exposed silanol groups on the surface of the colloid, followed by condensation and subsequent formation of surface siloxane bonds.

Example 3. Surface Modification of Commercial Silica Colloid 10 g of SiO$_2$ colloids (LUDOX™, 40 wt %, pH 9.0), were first diluted to a final concentration of 13.3 wt % using distilled water. While stirring at room temperature, 1.2 g of SBS was added to the SiO$_2$ solution. After 12 hrs of stirring, the treated colloids were extensively dialyzed for three days (with 14,000 molecular-weight-cutoff dialysis tubing) against distilled water in a covered beaker. In order to avoid precipitation of the colloids during dialysis, ammonium hydroxide was added to adjust the pH of the bathing solution to 9.0. The same procedure was followed for the samples prepared with lower SBS amounts per gram of SiO$_2$.

Since coupling reactions, like the one involving formation of siloxane bonds, proceed more efficiently when performed in the presence of an organic solvent and under argon atmosphere, we carried out the functionalization reaction in DMSO. The various ratios used in this example were 9.11×10$^{-4}$, 7.288×10$^{-4}$, 5.466×10$^{-4}$, or 3.64×10$^{-4}$ mols of SBS per 1 g SiO$_2$.

The following is a specific example of the procedure when SBS was added as 9.11×10$^{-4}$ moles per 1 g of SiO$_2$. 10 g of SiO$_2$ colloids (40 wt %, pH 9.0), were first diluted to a final concentration of 13.3 wt % using double distilled water. 20 mL of DMSO were added to replace water by azeotropic dehydration using a rotovap operating at 60° C.

The distillation was stopped when no more water condensed and reached the collection flask. After cooling the solution down to room temperature, 1.2 g of SBS (329.5 g mol$^{-1}$) and 0.1 ml of water (to catalyze the hydrolysis of the zwitterion silanol) were added and the solution stirred at room temperature for 12 hrs under argon. The sample was purified by extensive dialysis for three days against distilled water using 14,000 molecular-weight-cutoff dialysis tubing. In order to avoid precipitation of the colloids during dialysis, ammonium hydroxide was added to adjust the pH of the bathing solution to 9.0. The same procedure was followed for the samples prepared with lower SBS amounts per gram of $SiO_2$.

Example 4. Characterization of SiZwi

Assuming 8 silicon atoms exist per square nanometer of $SiO_2$ surface (Alexander, G. B.; Iler, R. K. U.S. Pat. No. 2,897,797, 1959) 22 nm colloid has $1.86 \times 10^{-3}$ moles of surface Si—OH per 1 g of $SiO_2$ (specific area 140 m$^2$ g$^{-1}$). According to the illustration in Example 2, above, each molecule of SBS anchors to the surface by linking to three other silicon atoms via siloxane bonds. In this case, "complete surface coverage" is defined as the theoretical amount of SBS required to cover every three SiOH, i.e. $6.2 \times 10^{-4}$ moles of SBS per 1 g of $SiO_2$. The theoretical elemental analysis results for complete surface coverage were determined as follows:
Molar mass of hydrolyzed sulfobetaine silane attached to the silica colloid surface $(C_8H_{18}NO_3S)Si = 237$ g mol$^{-1}$
Mass of $(C_8H_{18}NO_3S)Si = (6.2 \times 10^{-4}) \times 237 = 0.15$ g
For 1 g of colloids we have 0.1 5 g of sulfobetaine and total mass=1.15 g $$\% \ C = \frac{6.2 \times 10^{-4} \times 8 \times 12}{1.15} \times 100$$
$$= 5.2\%$$

$$\% \ S = \frac{6.2 \times 10^{-4} \times 1 \times 32}{1.15} \times 100$$
$$= 1.73\%$$

$$\% \ H = \frac{6.2 \times 10^{-4} \times 1 \times 18}{1.15} \times 100$$
$$= 0.97\%$$

Respective elemental analysis results, (Atlantic Microlab), for $(C_8H_{18}NO_3S)SiO_2$, prepared in water, using $9.11 \times 10^{-4}$, $7.288 \times 10^{-4}$, $5.466 \times 10^{-4}$, or $3.64 \times 10^{-4}$ mols of SBS per 1 g $SiO_2$ were: found (theory for full coverage): C, 1.66, 1.66, 1.63, 1.57% (5.19%), S, 0.48, 0.43, 0.46, 0.47% (1.73%), H, 0.83, 0.85, 0.84, 0.82% (0.97%). For reference, elemental analysis results for as-received $SiO_2$ nanoparticles were: C, 0.18%, H, 0.43%. Both, carbon and sulfur analysis results indicate that number of moles of SBS coupled per 1 g of $SiO_2$ has an upper and lower limits of $1.6 \times 10^{-4}$ and $1.5 \times 10^{-4}$ respectively. This amounts to a maximum of around 26% of the theoretical maximum surface coverage, although in some cases the added amount of SBS was in sufficient excess to produce full surface coverage
Respective elemental analysis results, (Atlantic Microlab), for $(C_8H_{18}NO_3S)SiO_2$, prepared in DMSO, using $9.11 \times 10^{-4}$, $7.288 \times 10^{-4}$, $5.466 \times 10^{-4}$, or $3.64 \times 10^{-4}$ mols of SBS per 1 g $SiO_2$ were: found (theory for full coverage): C, 1.53, 1.64, 1.54, 1.35% (5.19%), S, 0.39, 0.43, 0.42, 0.30% (1.73%), H, 0.78, 0.84, 0.81, 0.74% (0.97%). For reference, elemental analysis results for as-received $SiO_2$ nanoparticles were: C, 0.18%, H, 0.43%. Both, carbon and sulfur analysis results indicate that number of moles of SBS coupled per 1 g of $SiO_2$ has an upper and lower limits of $1.6 \times 10^{-4}$ and $1.2 \times 10^{-4}$ respectively. This amounts to a maximum of around 26% of the theoretical maximum surface coverage, although in some cases the added amount of SBS was in sufficient excess to produce full surface coverage.

It should be noted that the illustration of Example 2, above, is only illustrative, as it is known that trifunctional alkoxysilanes produce more nonidealized surfaces, condensing with themselves instead of surface Si—OH groups in many cases, to yield a "carpet" of surface modification. Another contribution to the low surface coverage could be that SBS started to hydrolyze and condense while in acetone. This is supported by the slight broadening in the NMR spectrum of the SBS. The acetone we used contained 0.5% water, which may be enough to catalyze the condensation reaction.

Example 5. Particle Sizes

The hydrodynamic radius ($R_h$) of SiZwi, aqueous or organic based preparations, was measured in solution using quasielastic light scattering (Wyatt Technologies) to determine whether during the condensation reaction, interparticle bridging and aggregation had taken place.

SiZwi samples having a concentration of 0.033 mg mL$^{-1}$ were prepared in 0.125 M NaCl and 25 mM Tris buffer pH 9.0. The solution was filtered through 0.02 μm and 0.2μ Anotop™ microfilters before and after adding SiZwi respectively. $R_h$ of SiZwi, prepared from $9.11 \times 10^{-4}$ moles of SBS per 1 g $SiO_2$ in aqueous solution was 18.8±2 nm. This indicates that during the condensation reaction, interparticle bridging and aggregation does not take place. The data for other samples are shown in Table 1.

TABLE 1

Hydrodynamic radius of SiZwi prepared in water or DMSO using different SBS amounts.

| Moles of SBS per 1 g $SiO_2$ | $^1$Rh (nm) | $^2$Rh (nm) | Standard deviation (±nm) |
|---|---|---|---|
| $9.11 \times 10^{-4}$ | 18.8 | 18.3 | 2.0 |
| $7.288 \times 10^{-4}$ | 18.4 | 18.6 | 2.3 |
| $5.466 \times 10^{-4}$ | 18.4 | 18.7 | 2.1 |
| $3.64 \times 10^{-4}$ | 18.8 | 18.6 | 2.0 |
| $^3$0 | $^3$19.5 | N/A | 2.5 |

[1] Reaction carried out in double distilled water.
[2] Reactions carried out in DMSO.
[3] As received, untreated LUDOX™ silica colloids.

Example 6. C13 NMR of Coated Silica Nanoparticles

The presence of SBS on the surface of the silica colloids was further confirmed using $^3$C solid-state NMR. The following is a specific example for the case when $9.11 \times 10^{-4}$ moles of SBS are added per 1 g $SiO_2$ in aqueous solution. Other samples, with lower SBS amount or prepared in DMSO instead of water, showed similar results.

First the spectrum of the as-made SBS (before reacting with the silica colloids) was recorded at room temperature, followed by SiZwi. The peak assignments and chemical shifts were as follows:

$^{13}$C NMR (Tetramethylsilane external standard, Magic angle spinning 10 KHz, 125.8 MHz): δ 34 (A), −10 (B), 2 (C), 50 (D), 45 (E), 5 (F).

Figure 3:
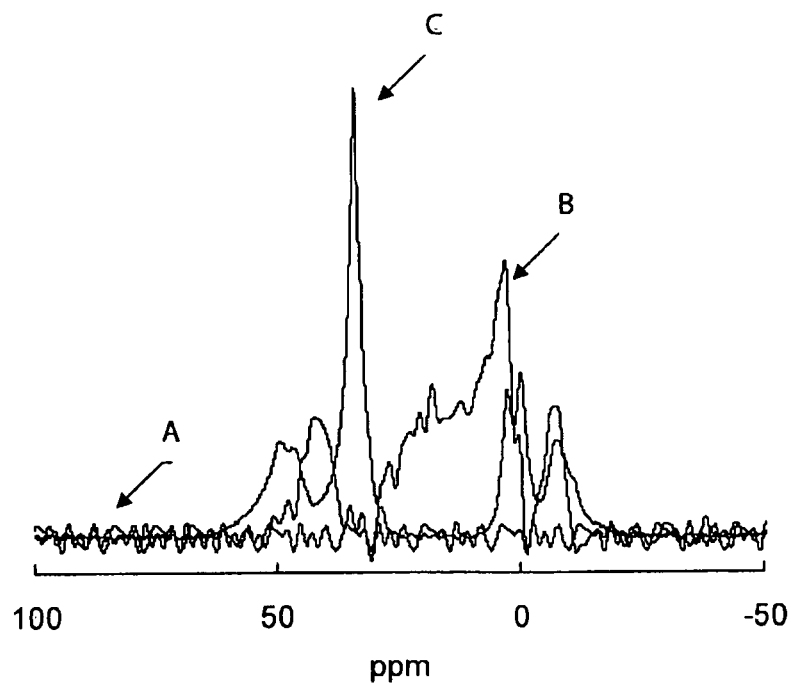
FIG. 3 is a display of NMR spectra wherein curves A, B and C represent $^{13}C$ solid state NMR spectra of untreated silica colloids, SiZwi, and sulfobetaine silane monomer.

The spectrum of the treated colloids showed more broadened peaks, possibly due to polymerization of the sulfobetaine silane on the surface of the silica colloids. The disappearance of the tinmethoxy peak at δ=34, is an indication of hydrolysis (FIG. 3) which precedes condensation and subsequent immobilization of the ligand on the silica colloid surface. For reference, the $^{13}$C NMR spectrum of the bare untreated colloids was also collected. No peaks were observed, consistent with the absence of surface adsorbed ligands. See FIG. 3.

Example 7. Stability of SiZwi in Salt Solutions

The stability of SiZwi in comparison to bare SiO$_2$ colloids, while present in saline media, was evaluated from turbidimetry experiments. The following is a specific example for the case when 9.11×10$^{-4}$ moles of SBS are added per 1 g SiO$_2$ in aqueous solution. Other samples, with lower SBS amounts or prepared in DMSO instead of water, showed similar behavior.

Figure 4:
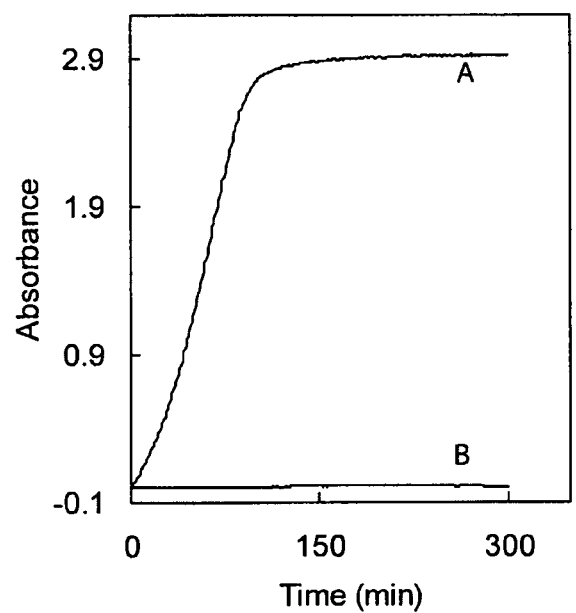
FIG. 4 is a graph showing the effect of salt on the stability of colloids, wherein the first 5 hrs are shown and curves A and B represent as-received $SiO_2$ (LUDOX™) colloids and SiZwi, colloid solutions were prepared in TrisHCl buffer (25 mM; pH=9.0), and turbidometry experiments were carried out at 25° C., 0.8 M NaCl and $\lambda$=500 nm.

The scattering from 0.8M NaCl solutions of SiZwi and untreated SiO$_2$ colloids (4.3 wt %) was monitored over a period of few hours, using a spectrophotometer at a wavelength of 500 nm. As the particles start to aggregate, because of salt, scattering is enhanced and this is reflected as an increase in absorbance. Over a period of 24 hours no scattering was observed for SiZwi but the untreated sample started to aggregate after 10 minutes (FIG. 4). SiZwi continued to be stable even when the ionic strength increased to 3.0 M NaCl. As expected, the addition of electrolytes has detrimental effects on the electrostatically stabilized as-received SiO$_2$ colloids. See FIG. 4.

Iler proposed that hydrated cations work as bridging agents providing interparticle bonding. In the case of sodium chloride for instance, hydrated sodium ions in the Stern layer will exchange one of the oxygen atoms of the surrounding water molecules by the oxygen of silanol group on the particle surface. When the Gouy layer is thin enough nothing would prevent the sodium ion in the Stern layer from exchanging another oxygen atom of water molecules by an oxygen atom of silanol group on the approaching particle.

In contrast, SiZwi revealed the distinct advantage of forming very stable systems irrespective of solution ionic strength. In the presence of salt, the chemically adsorbed SBS serves as a barrier around each particle preventing them from coming into contact and forming gels. At the same time, intramolecular attractions between oppositely charged groups on zwitterions are screened by added salt. As a result the colloids continue to exist in a stable form.

Example 8. Stability of SiZwi Against Protein-Induced Aggregation

The stability of SiZwi in comparison to bare SiO$_2$ colloids, in the presence of oppositely charged proteins, was evaluated from turbidimetry experiments. The following is a specific example for the case when 9.11×10$^{-4}$ moles of SBS are added per 1 g SiO$_2$ in aqueous solution. Other samples, with lower SBS amount or prepared in DMSO instead of water, showed similar behavior.

Figure 5:
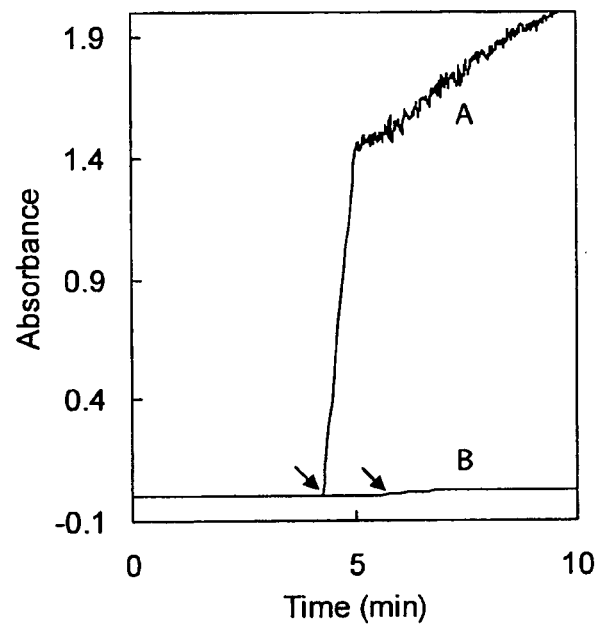
FIG. 5 is a graph showing the effect of lysozyme on the stability of silica colloids (10 wt % solutions), wherein curves A and B correspond to untreated silica colloids and SiZwi, respectively, arrows indicate the point at which lysozyme was added to a final concentration of 1.0 mg mL$^{-1}$, colloid solutions and protein stock solutions were prepared in imidazole buffer (25 mM; pH=7.4, 0.2 M NaCl), and turbidimetry experiments were carried out at t=25° C. and λ=500 nm.

To check whether SiZwi is passivated against non-specific interactions, we monitored the stability of the colloids in the presence of lysozyme (FIG. 5). The increase in the scattering from SiZwi and as-received SiO$_2$ colloids (both 10 wt %), as a function of lysozyme (added to a final concentration of 1.0 mg mL$^{-1}$, isoelectric point of 11.5) was followed again using a spectrophotometer (at 25° C. and λ=500 nm). Both colloid solutions contained 0.2M NaCl, and the solution pH was adjusted to 7.4 using imidazole buffer (25 mM). In contrast to the as-received SiO$_2$ colloids that precipitated in the presence of 1 mg mL$^{-1}$ lysozyme, SiZwi maintained the characteristics of stable aquasols. See FIG. 5.

In the absence of 0.2 M NaCl, SiZwi precipitated upon addition of lysozyme. This is due to the interaction between the residual negatively charged silanol groups, on the SiZwi surface, and the positively charged protein. In the project proposed below, a denser shell of zwitterion around the silica core will allow for better surface coverage and eliminate the need for salt to stabilize SiZwi in the presence of lysozyme.

Example 9. Stability of SiZwi Against pH Changes

The stability of SiZwi in comparison to bare SiO$_2$ colloids, when present in an acidic media, was evaluated from turbidimetry experiments. The following is a specific example for the case when 9.11×10$^{-4}$ moles of SBS are added per 1 g SiO$_2$ in aqueous solution. Other samples, with lower SBS amount or prepared in DMSO instead of water, showed similar behavior.

Figure 6:
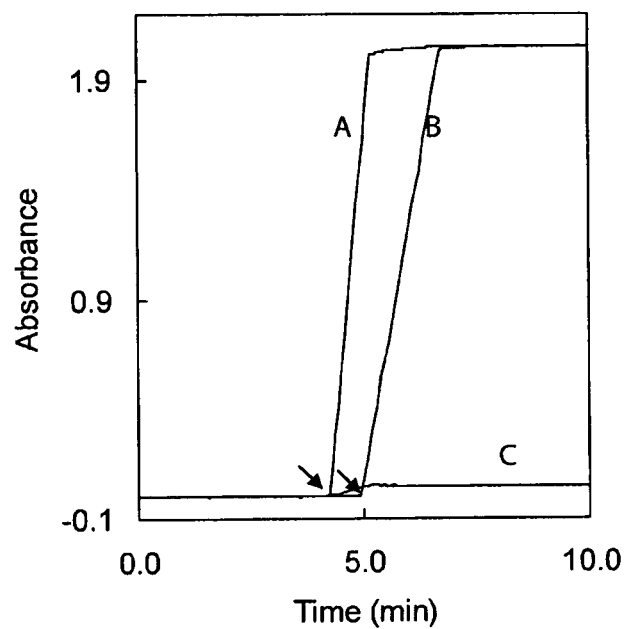
FIG. 6 is a graph showing the effect of decreasing the pH of the solution on the stability of silica colloids (10 wt % solutions), wherein curves A and B correspond to untreated silica colloids and SiZwi, both samples were prepared in imidazole buffer 25 mM; pH=7.4, 0.2 M NaCl, arrows indicate the point at which the pH decreased to about 2.0 by the addition of HCl (1.0 M), curve C correspond to SiZwi prepared in imidazole buffer (25 mM; pH=7.4) containing 1.0 M NaCl, the stability of the colloids is shown to be now independent of solution pH, and turbidimetry experiments were carried out at t=25° C. and λ=500 nm.

Decreasing the pH of the solution to 2.0, for example, was found to precipitate both SiZwi and untreated SiO$_2$. However, in contrast to the latter, SiZwi did not gel irreversibly. SiZwi can be dispersed back to a sol by adding water, as soon as the destabilizing conditions are corrected (increasing the pH back to 9.0, using ammonium hydroxide for example). Also vacuum concentration of SiZwi, at 30° C., afford silica colloids in the form of white precipitate that, in contrast to untreated silica sols, can be repeptized with water. This indicates that the presence of sulfobetaine molecules on the silica particle's surface is preventing interparticle crosslinking and permanent gelling. Yet it is not enough to prevent particles from aggregating, and the presence of negative charges is still crucial so they can repel each other and exist as stable colloids. Increasing the ionic strength of the solution is a well acknowledged procedure to increase the solubility of zwitterionic compounds. Indeed, at salt concentrations ≥1.0 M the dependence of SiZwi stability on pH of the solution disappeared. See FIG. 6.

However if the use of these particles is desired at pH<9.0, without adding NaCl to increase the ionic strength of the silica sols, stable formulations can be obtained by chemically modifying the surface of a silica, preferably in the form of a silica sol, with a mixture of silanes comprising sulfobetaine and weak acid groups, of the general formula

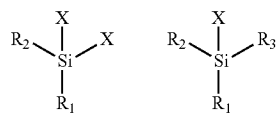

Where x is an alkoxy group, such as methoxy, ethoxy, 2-methoxy-ethoxy or any other chemical group of the like which upon hydrolysis will produce an OH group attached to the silicon atom. $R_1$, $R_2$, $R_3$, can be an alkyl, aryl, aralkyl, alkaryl, or alkylene organic radical with 1 to 12 carbon atoms, which can optionally contain a functional group such as mercapto, epoxy, acrylyl, methacrylyl, or amino. They can be the same or different but at least one of them must comprise a tertiary amine group that can be reacted with propane sultone to produce a sulfobetaine organic radical. Also, at least one of them must comprise a primary, secondary or tertiary amino group that will be protonated at pH<9.0. The amino functional group is preferably in the form —$CH_2$—$CH_2$—$CH_2$—$NH_2$, —$CH_2$—$CH_2$—$CH_2$—$NHCH_3$, or —$CH_2$—$CH_2$—$CH_2$—$N(CH_3)_2$.

Figure 7:
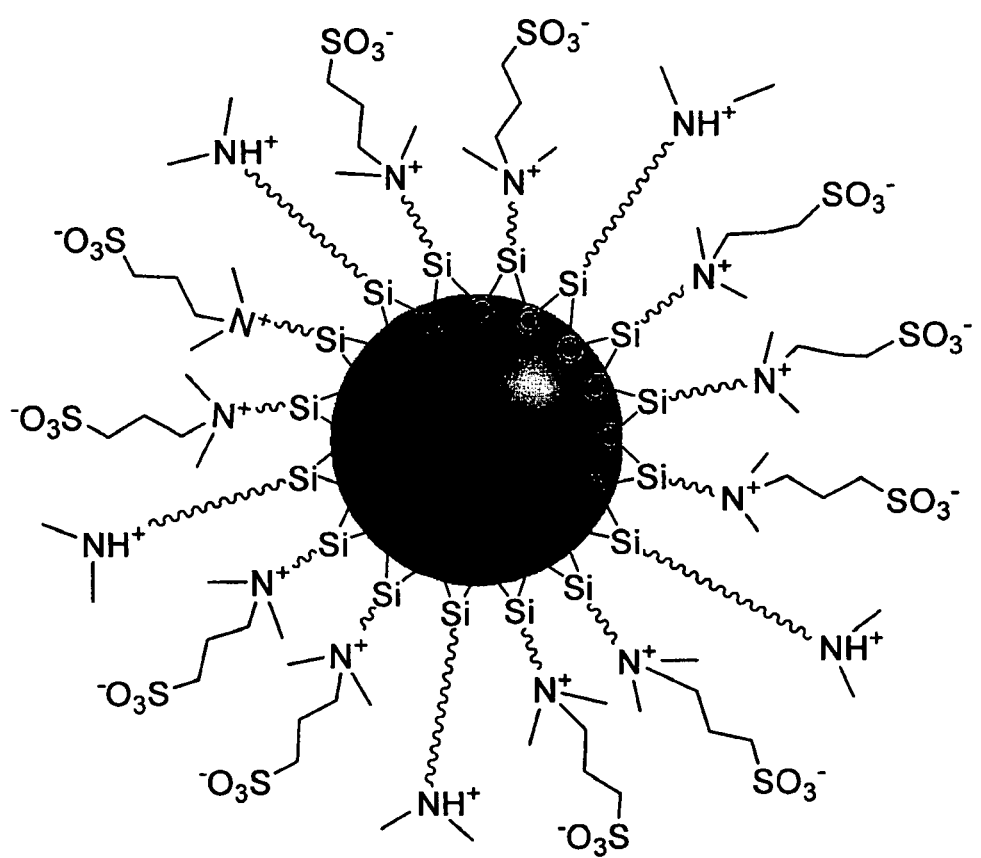
FIG. 7 is a schematic representation of SiZwiT showing sulfobetaine and weak acid groups extending outwards into solution.

The reaction product is believed to be represented by the following scheme, showing siloxane functionality condensed on the surface of the silica colloid with sulfobetaine and weak acid functionalities extending outwards into solution (FIG. 7). When ligated on the surface of the silica colloids, the sulfobetaine group and the group bearing the weak acid functional group can cover, for example, 0.1 to 100 percent of the surface area of the colloid. From hereon this kind of functionalized silica colloids is referred to as SiZwiT. See FIG. 7.

Example 10. Synthesis of Silica Nanoparticles Comprising Mixed Surface Silanes SiZwiT, a silica surface comprising a mixture of zwitterionic and non-zwitterionic functionality, was synthesized according to the following specific example.

10 g of $SiO_2$ colloids (40 wt %, pH 9.0), were first diluted to a final concentration of 13.3 wt % using double distilled water. While stirring at room temperature, 1:1 mole ratio of SBS (0.24 g, 329.5 g $mol^{-1}$) and aminopropyltrimethoxysilane, APT (152.4 μL, 207.34 g. $mol^{-1}$, 0.984 g $cm^{-3}$) were added simultaneously to the $SiO_2$ solution. After 12 hrs of stirring, the treated colloids were extensively dialyzed for three days (with 14,000 molecular-weight-cutoff dialysis tubing) against distilled water in a covered beaker.

Characterization of SiZwiT

The hydrodynamic radius ($R_h$) of SiZwiT, measured in solution (0.033 mg $ml^{-1}$ in 0.125 M NaCl and 25 mM Tris buffer pH 9.0) using quasielastic light scattering (Wyatt Technologies), was 18.9±2 nm. This indicates that during the condensation reaction, interparticle bridging and aggregation does not take place.

As was described earlier, a 22 nm colloid has $1.86 \times 10^{-3}$ moles of surface Si—OH per 1 g of $SiO_2$ (specific area 140 $m^2$ $g^{-1}$). According to the cartoon in FIG. 2, each molecule of SBS or APT anchors to the surface by linking to three other silicon atoms via siloxane bonds. Thus if the two alkoxysilane reagents were two have equal reactivity toward the surface, "complete surface coverage" is defined as the theoretical amount of SBS and APT required to cover every three SiOH, i.e. $3.1 \times 10^{-4}$ moles of SBS and $3.1 \times 10^{-4}$ of APT per 1 g of $SiO_2$. Elemental analysis results, (Atlantic Microlab), for SiZwiT were: found (theory for full coverage): C, 1.51% (4.4%), S, 0.15% (0.89%), H, 0.76% (0.84%). For reference, elemental analysis results for as-received $SiO_2$ nanoparticles were: C, 0.18%, H, 0.43%. Carbon analysis result indicates that the total surface coverage of SiZwiT amounts to 31% of the theoretical maximum surface coverage. Sulfur analysis result indicates that $5.3 \times 10^{-5}$ moles of SBS are coupled per 1 g of $SiO_2$. This amounts to ca. 8.5% SBS of the theoretical maximum surface coverage, and consequently 22.5% APT. (Although SBS and APT were added in 1:1 mole ratio, the mole ratio on the surface is 1:2.5).

Example 11

Figure 8:
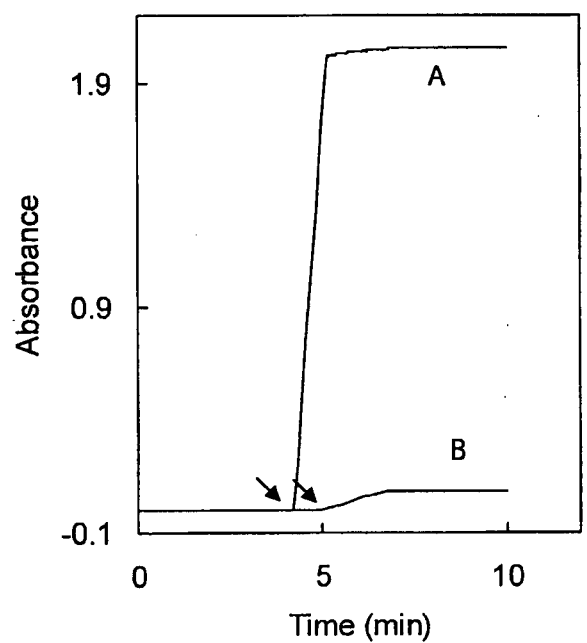
FIG. 8 is a graph showing the effect of pH on the stability of silica colloids (10 wt % solutions), wherein curves A and B correspond to untreated silica colloids and SiZwiT respectively, arrows indicate the point at which the pH decreased to 2.0 by the addition of 1.0 M HCl, no salt was added to stabilize SiZwiT against precipitation, and turbidometry experiments were carried out at t=25° C. and λ=500 nm, the graph illustrating that when the silica surface comprises APT in addition to sulfobetaine, decreasing the pH to 2.0 does not cause flocculation.

The increase in absorption upon changing the pH of SiZwiT and untreated silica solutions (both 10 wt %) was followed at t=25° C. and λ=500 nm (FIG. 8). In contrast to both SiZwi (NaCl solution concentration <1.0 M) and untreated silica that flocculated when the solution pH changed from 9.0 to 2.0, NaCl free solutions of SiZwiT were found pH insensitive. Although SiZwiT was observed to flocculate upon adding HCl, the precipitate redissolved instantly when stirred. See FIG. 8.

As the pH of the solution goes below 9.0, the excess unreacted silanols are increasingly protonated, and repulsion due to the negative charges is reduced. Under the same conditions, the amine groups are predominantly positively charged. Here repulsion due to the presence of positive charges, and salt indifference imparted by the sulfobetaine groups, allows SiZwiT to exist as stable sols (this was demonstrated for a period of 2 hr) irrespective of solution ionic strength or pH.

We have demonstrated (as illustrated in the above examples) that gelation and flocculation resistant silica colloids can be prepared in aqueous and organic solvents. Just 28% of the maximum surface coverage has been found to be enough to impact the behavior of $SiO_2$ colloids significantly in the presence of three destabilizing conditions: salt oppositely charged bio-macromolecules, and pH. The facile surface modification protocols of silica formulations allow the ligation of a cocktail of chemical functionalities that can be further utilized to anchor other molecules of interest.

What is claimed:

1. A nanoparticle comprising (a) a nucleus having a size that is no greater than 100 nm, wherein the size corresponds to the smallest sieve opening through which said particle is able to pass, and comprising a silica outer surface and (b) a plurality of zwitterionic functional groups covalently bound to the silica outer surface.

2. The nanoparticle as set forth in claim 1 wherein the zwitterionic functional groups are pH-independent.

3. The nanoparticle as set forth in claim 2 wherein the zwitterionic functional groups are selected from the group consisting of N,N-dimethyl-N-acryloyloxyethyl-N-(3-sulfopropyl)-ammonium betaine, N, N-dimethyl-N-acrylamidopropyl N-(3-sulfopropyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, 1-(3-sulfopropyl)-2-vinylpyridinium betaine, N-(4-sulfobutyl)-N methyl-N,N-diallylamine ammonium betaine (M DABS), N, N-diallyl-N-methyl-N-(2-sulfoethyl) ammonium betaine, N, N-dimethyl-N-(3-methacrylamidopropyl)-N-(3-sulfopropyl) ammonium betaine, N, N-dimethyl-N-acryloyloxyethyl-N-(3-sulfopropyl)-ammonium betaine, N, N-dimethyl-N acrylamidopropyl-N-(2-carboxymethyl)-ammonium betaine, N, N-dimethyl-N-methacryloyloxyethyl-N-(3-sulfopropyl)-ammonium betaine, and N, N-dimethyl-N-(3-methacrylamidopropyl)-N-(3-sulfopropyl) ammonium betaine.

4. The nanoparticle as set forth in claim 1 wherein the zwitterionic functional groups are pH-dependent.

5. The nanoparticle as set forth in claim 4 wherein the zwitterionic functional groups are selected from the group consisting of N,N-dimethyl-N acrylamidopropyl-N-(2-carboxymethyl)-ammonium betaine, N,N-dimethyl-N-acrylamidopropyl-N-(2-carboxymethyl)-ammonium betaine, [(2-acryloylethyl)dimethylammonio]methyl phosphonic acid, (2-acryloxyethyl) carboxymethylmethylsulfonium chloride and carboxybetaines.

6. The nanoparticle as set forth in claim 1 wherein the plurality of zwitterionic functional groups comprises pH-independent zwitterionic groups and pH-dependent zwitterionic groups.

7. The nanoparticle as set forth in claim 1 wherein the zwitterionic functional groups are selected from the group consisting of sulfobetaine, phosphatidylcholine, and combinations thereof.

8. The nanoparticle as set forth in claim 7 wherein the zwitterionic functional groups are sulfobetaines of the formula

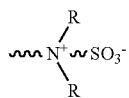

wherein R is aliphatic of length 1 to about 18 carbons, pyrrolidine, piperidine or a derivative of phenylamine.

9. The nanoparticle as set forth in claim 1 wherein the zwitterionic functional groups are covalently bound to the silica outer surface of the nucleus via silane groups having the formula

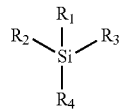

wherein $R_1$, $R_2$, $R_3$ and $R_4$ are independently selected from among alkyl, alkoxy, alkylether, akylester, aryl, amidoalkane, each of chain length 1 to about 18 carbons, arylether, aryloxy, arylester, and Surf-, where Surf represents a siloxane bridging group (—Si—O—) at the silica outer surface; and at least one of $R_1$, $R_2$, $R_3$ and $R_4$ comprises a zwitterion functional group; and at least one of $R_1$, $R_2$, $R_3$ and $R_4$ comprises Surf-.

10. The nanoparticle as set forth in claim 1 wherein the zwitterionic functional groups correspond to the formula

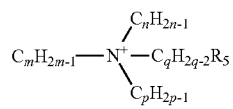

wherein m, n, p, q are each from 1 to about 18 and $R_5$=$SO_3^-$, $PO_4^-$, or $COO^-$.

11. The nanoparticle as set forth in claim 1 wherein each of the zwitterionic functional groups is selected from the group consisting of

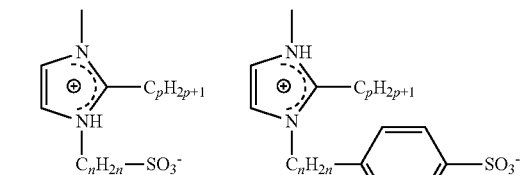

Sulfoalkyl imidazolium salts    Sulfoaryl imidazolium salts

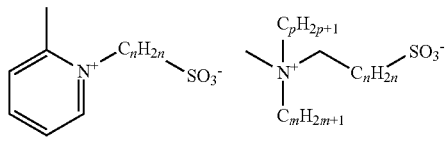

Sulfoalkyl pyridinium salts    Sulfoalkyl ammonium salts (sulfobetaine)

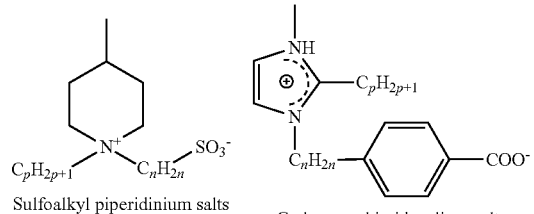

Sulfoalkyl piperidinium salts    Carboxyaryl imidazolium salts

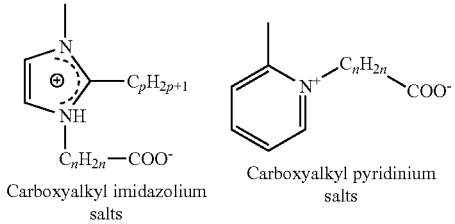

Carboxyalkyl imidazolium salts    Carboxyalkyl pyridinium salts

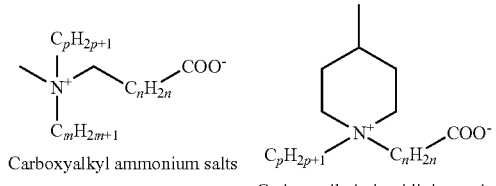

Carboxyalkyl ammonium salts    Carboxyalkyl piperidinium salts

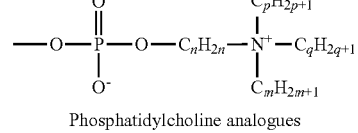

Phosphatidylcholine analogues

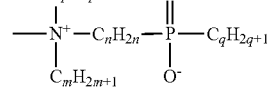

Ammonium phosphonate salts

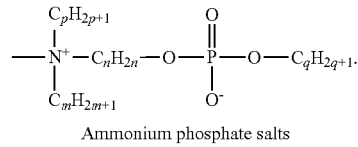

Ammonium phosphate salts

12. The nanoparticle as set forth in claim 1 further comprising surface-bound silanes comprising functionality selected from the group consisting of carboxylates, mercapto, esters, alcohols, carbamides, aldehydes, amines, imidazoles, pyridines, sulfur oxides, nitrogen oxides, halides, ester, thioester, sulfate ester, disulfide and amide.

13. The nanoparticle as set forth in claim 1 wherein the nucleus further comprises one or more of the following: a fluorescent group, at least one radioactive nuclide, and a MRI contrast material.

14. The nanoparticle as set forth in claim 13 wherein the at least one radioactive nuclide are selected from the group consisting of $^{99m}$Tc, $^{111}$Ag, $^{199}$Au, $^{67}$Cu, $^{64}$Cu, $^{165}$Dy, $^{166}$Dy, $^{69}$Er, $^{166}$Ho, $^{111}$In, $^{177}$Lu, $^{140}$La, $^{32}$P, $^{103}$Pd, $^{149}$Pm, $^{193}$Pt, $^{195}$Pt $^{186}$Re, $^{188}$Re, $^{105}$Rh, $^{90}$Sr, $^{175}$Yb, and $^{90}$Y; and the MRI contrast material is selected from the group consisting of chromium(III), manganese(II), iron(II), cobalt(II), nickel (II), copper(II), praseodymium(III), neodymium(III), samarium(III), ytterbium(III), gadolinium(III), terbium(III), dysprosium(III), holmium(III), erbium(III), and iron(III) ion complexes of 1,4,7,10-tetracarboxymethyl-1,4,7,10-tetraazacyclododecane, diethylenetriaminepentaacetic acid, diethylenetriamine pentacetic acid-bis(methylamide), N,N'-bis(2-pyridylmethyl)diethylenetriamine-N,N', N"-triacetic acid, trans-1,2-diaminocyclohexne-N, N', N",N"'-tetraacetic acid, N,N'-bis(3hydroxy-6-methyl-2-pyridylmethyl)diethylenetriamine-N,N',N"-triacetic acid, and 1,7,1 3-triaza-4,10, 16-trioxacyclooctanedecane-N,N',N"-triacetic acid, metalloporphyrins, ferrous gluconate, ferric ammonium citrate, and monocrystalline iron oxide nanocompounds.

15. The nanoparticle as set forth in claim 1 wherein the nucleus comprises a core selected from the group consisting of calcium carbonate, garnet, nanodiamond, silicates, polymers, metals, metal alloys, metal oxides, and semiconductors.

16. The nanoparticle as set forth in claim 15 wherein the metals are selected from the group consisting of gold, silver, cobalt, chromium, copper, aluminum, nickel, platinum, lead, palladium, iron and alloys thereof; the metal oxides are selected from the group consisting of aluminum oxide, cerium(IV) oxide, dysprosium(III) oxide, erbium(III) oxide, gadolinium(III) oxide, holmium(III) oxide, samarium(III) oxide, titanium(IV) oxide, neodymium oxide, yttrium(III) oxide, zirconium(IV) oxide, cobalt oxide and iron oxide; and the semiconductors are selected from the group consisting of cadmium selenide, cadmium tellurium, cadmium sulfide, zinc sulfide, zinc selenide, lead sulfide, lead selenide, gallium arsenide, gallium phosphide, indium phosphide and indium arsenide.

17. The nanoparticle as set forth in claim 16 wherein the nucleus is a homonucleus.

18. The nanoparticle as set forth in claim 1 wherein the nucleus is a homonucleus.

19. The nanoparticle as set forth in claim 18 wherein the nucleus further comprises one or more dopants selected from the group consisting of fluorescent molecules, aluminum, boron, titanium, zirconium, tin, vanadium, and radioactive nuclides.

20. The nanoparticle as set forth in claim 1 wherein the nucleus has a configuration that is selected from the group consisting of a sphere, hollow shell, rod, plate, ribbon, prism, and star.

21. The nanoparticle as set forth in claim 1 wherein the nucleus is a sphere.

22. A dispersion comprising a plurality of the nanoparticles of claim 1 dispersed in a medium selected from the group consisting of aqueous solutions, organic solutions, oils, emulsions, organic solids, magnetic storage media, lubricants, waxes, plastics, papers, fiber pulps, gels, particulate suspensions, inks, epoxies, biological fluids, cell growth media, wherein said dispersion comprises between 0.001 wt % and 95 wt % of the nanoparticles.

23. The dispersion as set forth in claim 22 wherein the medium is a liquid.

24. The dispersion as set forth in claim 23 wherein the dispersion is colloidal.

25. The dispersion as set forth in claim 22 wherein the dispersion is an abrasive dispersion.

26. The dispersion as set forth in claim 25 further comprising particles selected from the group consisting of silica, alumina, titania, ceria, zirconia, calcium carbonate, garnet, diamond, and silicates.

27. The dispersion as set forth in claim 25 wherein the mean diameter of the nanoparticles possesses a bimodal distribution.

28. The dispersion as set forth in claim 25 comprising populations of nanoparticles of different composition.

29. The dispersion as set forth in claim 25 further comprising nanoparticles that do not have a plurality of covalently bound zwitterionic functional groups on their surface.

30. The dispersion as set forth in claim 22 wherein the-nanoparticles further comprise surface-bound silanes comprising a functionality selected from the group consisting of carboxylates, mercapto, esters, alcohols, carbamides, aldehydes, amines, imidazoles, pyridines, sulfur oxides, nitrogen oxides, halides, ester, thioester, sulfate ester, disulfide and amide.

31. The dispersion as set forth in claim 22 wherein each nucleus comprises a core of a first material within a shell of a second material that is different from the first material, such that outer surface of the nucleus corresponds to the outer surface of the shell, and wherein the first material is selected from the group consisting of polymers, alumina ($Al_2O_3$), titania ($TiO_2$), ceria ($CeO_2$), zirconia ($ZrO_2$), calcium carbonate, garnet, and silicates, and the second material is silica.

32. The dispersion as set forth in claim 22 wherein the nanoparticles are attached to, or embedded in, larger particles comprising a polymer.

33. The dispersion as set forth in claim 22 further comprising one or more agents selected from the group consisting of oxidizing agents, chelating agents, surfactants, buffers, passivating agents, viscosity modifiers, wetting agents, stopping compounds, and lubricants.

34. The dispersion as set forth in claim 22 further comprising one or more chemically reactive zwitterions independently selected from the group consisting of
(i) thiols of the formula H—S—$R_1$—Z or wherein Z is a zwitterionic functional group and $R_1$ is a hydrocarbon moiety covalently linking Z and S,
(ii) disulfides of the formula Z—$R_1$—S—S—$R_2$—Z wherein Z is a zwitterionic functional group and $R_1$ and $R_2$ are independently hydrocarbon moieties covalently linking Z and S, and
(iii) reactive zwitterion silanes of the following formula:

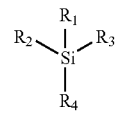

wherein $R_1$, $R_2$, $R_3$ and $R_4$ are independently alkyl, alkoxy, alkylether, akylester, aryl, amidoalkane, each of chain length 1 to about 18 carbons, arylether, aryloxy, arylester, wherein at least one of $R_1$, $R_2$, $R_3$, and $R_4$ comprises a zwitterion group, and wherein at least one of $R_1$, $R_2$, $R_3$, and $R_4$ is chloro or —O—$C_tH_{2t-1}$ where t is from 1 to about 18.

35. A process for producing the nanoparticle set forth in claim 1, said process comprising treating the silica outer surface of the nucleus with a zwitterion silane of the formula:

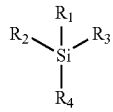

wherein $R_1$, $R_2$, $R_3$ and $R_4$ are independently selected from the group consisting of alkyl, alkoxy, alkylether, akylester, aryl, amidoalkane, arylether, aryloxy, arylester, and chloro, wherein at least one of $R_1$, $R_2$, $R_3$ and $R_4$ comprises a zwitterion group, and wherein at least one of $R_1$, $R_2$, $R_3$ and $R_4$ comprises chloro or alkoxy.

36. A process for producing the nanoparticle as set forth in claim 31, wherein the zwitterion silane is a zwitterion alkoxysilane that has the following formula:

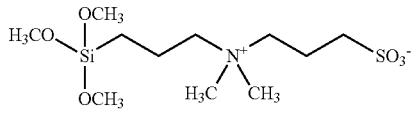

37. A polishing pad comprising the nanoparticles as set forth in claim 1.

38. A nanoparticle comprising (a) a nucleus having a size that is no greater than 100 nm, wherein the size corresponds to the smallest sieve opening through which said particle is able to pass, and a silica outer surface and (b) a plurality of zwitterionic functional groups covalently bound to the silica outer surface of the nucleus via silane groups, wherein the silane groups have the formula

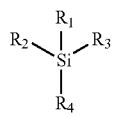

wherein $R_1$, $R_2$, $R_3$ and $R_4$ are independently selected from among alkyl, alkoxy, alkylether, akylester, aryl, amidoalkane, each of chain length 1 to about 18 carbons, arylether, aryloxy, arylester, and Surf-, where Surf represents a siloxane bridging group (—Si—O—) at the silica outer surface; and at least one of $R_1$, $R_2$, $R_3$ and $R_4$ comprises a zwitterion functional group; and at least one of $R_1$, $R_2$, $R_3$ and $R_4$ comprises Surf-.

39. The nanoparticle as set forth in claim 38 wherein the nucleus is a sphere.

* * * * *